United States Patent
Kim et al.

(10) Patent No.: US 12,204,365 B2
(45) Date of Patent: Jan. 21, 2025

(54) DATA RECEIVER, DISPLAY DEVICE INCLUDING THE SAME, AND METHOD OF RECEIVING DATA

(71) Applicant: SAMSUNG DISPLAY CO., LTD., Yongin-si (KR)

(72) Inventors: Jun Dal Kim, Yongin-si (KR); Dong Won Park, Yongin-si (KR); Hyun Su Kim, Yongin-si (KR); Kyung Youl Min, Yongin-si (KR); Jong Man Bae, Yongin-si (KR); Jun Yong Song, Yongin-si (KR); Tae Young Jin, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 38 days.

(21) Appl. No.: 17/704,334

(22) Filed: Mar. 25, 2022

(65) Prior Publication Data

US 2022/0397932 A1 Dec. 15, 2022

(30) Foreign Application Priority Data

Jun. 14, 2021 (KR) .................. 10-2021-0077053

(51) Int. Cl.
*G06F 1/10* (2006.01)
*G06F 13/40* (2006.01)
*G06F 13/42* (2006.01)

(52) U.S. Cl.
CPC ............ *G06F 1/10* (2013.01); *G06F 13/4004* (2013.01); *G06F 13/4282* (2013.01)

(58) Field of Classification Search
CPC ..... G06F 13/4004; G06F 13/4282; G06F 1/10
See application file for complete search history.

(56) References Cited

U.S. PATENT DOCUMENTS

| | | | |
|---|---|---|---|
| 7,362,303 B2 | 4/2008 | Jang | |
| 9,167,058 B2 | 10/2015 | Gresham et al. | |
| 9,281,935 B2 | 3/2016 | Lee et al. | |
| 9,466,263 B2 | 10/2016 | Bae et al. | |
| 9,503,064 B2 | 11/2016 | Cha et al. | |
| 9,658,643 B2 | 5/2017 | Jeong et al. | |
| 10,009,199 B2 * | 6/2018 | Suzuki | H04L 7/0016 |
| 10,313,100 B2 | 6/2019 | Yim | |
| 10,584,009 B1 * | 3/2020 | Wurmfeld | B65H 5/068 |

(Continued)

FOREIGN PATENT DOCUMENTS

| | | |
|---|---|---|
| KR | 1020040081279 A | 9/2004 |
| KR | 1020150095500 A | 8/2015 |

(Continued)

*Primary Examiner* — Brian T Misiura
(74) *Attorney, Agent, or Firm* — CANTOR COLBURN LLP

(57) ABSTRACT

A data receiver, which communicates with a data transmitter through a plurality of lanes, includes: a first reception unit which receives first data through a first lane; a second reception unit which receives second data through a second lane; and a detector which compares the first data and the second data to detect a skew between the first lane and the second lane. The first reception unit includes a first clock data recovery unit which recovers a first clock and first payload data from the first data. The first reception unit controls a loop speed of the first clock data recovery unit based on a skew level of the skew.

19 Claims, 17 Drawing Sheets

RX1: AFE1, CDR1
RX2: AFE2, CDR2

(56) References Cited

U.S. PATENT DOCUMENTS

| | | | |
|---|---|---|---|
| 10,657,875 B2 | 5/2020 | Chung et al. | |
| 10,726,808 B2 | 7/2020 | Han et al. | |
| 10,796,661 B2 | 10/2020 | Park | |
| 10,943,559 B2 | 3/2021 | Park | |
| 11,159,304 B2* | 10/2021 | Aziz | H04L 7/0062 |
| 2011/0138096 A1* | 6/2011 | Radulescu | G06F 13/385 |
| | | | 710/305 |
| 2013/0169328 A1* | 7/2013 | Shibasaki | H03L 7/0812 |
| | | | 327/156 |
| 2017/0331651 A1* | 11/2017 | Suzuki | H04L 7/0016 |
| 2021/0118356 A1 | 4/2021 | Lim et al. | |
| 2022/0053053 A1* | 2/2022 | Mizuno | H04L 69/324 |
| 2022/0397931 A1* | 12/2022 | Song | G06F 3/14 |
| 2022/0399915 A1* | 12/2022 | Kim | H04L 5/0053 |

FOREIGN PATENT DOCUMENTS

| | | |
|---|---|---|
| KR | 101671018 B1 | 10/2016 |
| KR | 1020190052186 A | 5/2019 |
| KR | 1020190055466 A | 5/2019 |
| KR | 102071573 B1 | 3/2020 |
| KR | 102091302 B1 | 3/2020 |
| KR | 1020200024984 A | 3/2020 |
| KR | 1020200041406 A | 4/2020 |
| KR | 102195408 B1 | 12/2020 |
| KR | 102234594 B1 | 4/2021 |

\* cited by examiner

<Step Control>

<Gain Control>

DATA RECEIVER, DISPLAY DEVICE INCLUDING THE SAME, AND METHOD OF RECEIVING DATA

This application claims priority to Korean Patent Application No. 10-2021-0077053 filed on Jun. 14, 2021, and all the benefits accruing therefrom under 35 U.S.C. § 119, the content of which in its entirety is herein incorporated by reference.

BACKGROUND

1. Field

The present invention relates to a data receiver, a display device including the same, and a method of receiving data.

2. Description of the Related Art

With the development of information technologies, the importance of a display device that serves as a connection medium between a user and information increases. Accordingly, a display device such as a liquid crystal display device and an organic light-emitting display device is increasingly used.

In general, the display device may perform internal communication using a mobile industry processor interface ("MIPI") protocol.

SUMMARY

In order to improve a data transmission speed, a transmission device (for example, an application processor) may transmit data to a receiver (for example, a display device) using a plurality of lanes.

Although the transmission device simultaneously outputs pieces of data to the lanes, a skew may occur between pieces of data (for example, first data and second data) received through the lanes by the receiver. Source data is recovered by rearranging (reconstructing or remapping) the pieces of data transmitted through the lanes, but the source data may not be properly recovered due to the skew.

One embodiment of the present invention provides a data receiver capable of compensating for a skew (for example, an inter-lane skew) occurring between lanes, a display device including the same, and a method of receiving data.

A data receiver according to embodiments of the present invention communicates with a data transmitter through a plurality of lanes. The data receiver includes: a first reception unit which receives first data through a first lane; a second reception unit which receives second data through a second lane; and a detector which compares the first data and the second data to detect a skew between the first lane and the second lane. The first reception unit includes a first clock data recovery unit which recovers a first clock and first payload data from the first data, and the first reception unit controls a loop speed of the first clock data recovery unit based on a skew level of the skew.

According to one embodiment, the detector may compare the first data and the second data to determine a slow lane of the first lane and the second lane and in which data transmission is relatively delayed, and the detector may provide information about the skew level to a reception unit of the first reception unit and the second reception unit and connected to the slow lane.

According to one embodiment, when the first lane is determined as the slow lane, a phase of the first payload data may be shifted by controlling the loop speed of the first clock data recovery unit connected to the first lane.

According to one embodiment, the first clock data recovery unit may recover the first clock and the first payload data using a proportional integral ("PI") control technique and may adjust a proportional gain of the PI control technique based on the skew level.

According to one embodiment, the first clock data recovery unit may include: an oscillator which outputs a clock having a frequency according to a control signal thereto; a phase detector which compares the first data and the clock; and a control circuit which adjusts the control signal based on an output of the phase detector. The control circuit may adjust the control signal using the PI control technique, and the clock may correspond to the first clock.

According to one embodiment, the control circuit may include: a first digital-to-analog converter which outputs a first analog signal proportional to the output of the phase detector; an integrator which integrates the output of the phase detector; and a second digital-to-analog converter which converts an output of the integrator into a second analog signal. The first analog signal and the second analog signal may be included in the control signal.

According to one embodiment, the control circuit may adjust a step of the first digital-to-analog converter based on the skew level, and with respect to a same output of the phase detector, as the skew level is increased, a level of the first analog signal may be also increased.

According to one embodiment, the control circuit may adjust a gain of the first digital-to-analog converter based on the skew level, and as the skew level is increased, the level of the first analog signal may be more rapidly increased for the same amount of increase in the output of the phase detector.

According to one embodiment, the control circuit may adjust the output of the phase detector provided to the first digital-to-analog converter based on the skew level.

According to one embodiment, the data receiver may further include a third reception unit which receives third data through a third lane, the detector may detect a skew between the second lane and the third lane, and the third reception unit may include a third clock data recovery unit which recovers a third clock and third payload data from the third data and may control a loop speed of the third clock data recovery unit based on a skew level of the skew between the second lane and the third lane.

According to one embodiment, the data receiver may further include: a first buffer which stores the first data in response to the first clock; and a second buffer which stores the second data in response to a second clock. The second reception unit may include a second clock data recovery unit which recovers the second clock and second payload data from the second data.

According to one embodiment, the first reception unit and the second reception unit may receive data according to a mobile industry processor interface (MIPI) protocol.

According to one embodiment, each of the first lane and the second lane may include a first sub-lane and a second sub-lane, each of the first and second reception units may receive signals having a first voltage range in a first mode through the first and second sub-lanes and receive signals having a second voltage range less than the first voltage range in a second mode through the first and second sub-lanes, and the first reception unit may be driven in order of the first mode, the second mode, and the first mode, when receiving the first data.

According to one embodiment, in the first mode, the first and second sub-lanes may be used in a single-ended manner, and in the second mode, the first and second sub-lanes may be used in a differential manner.

A display device according to embodiments of the present invention includes: a timing controller which communicates with a host through a mobile industry processor interface (MIPI) and generate image data; and a display panel which displays an image corresponding to the image data. The timing controller includes a first reception unit which receives first data through a first lane, a second reception unit which receives second data through a second lane, a remapper which rearranges the first data and the second data to generate the image data, and a detector which compares the first data and the second data to detect a skew between the first lane and the second lane, the first reception unit includes a first clock data recovery unit which recovers a first clock and first payload data from the first data. The first reception unit controls a loop speed of the first clock data recovery unit based on a skew level of the skew.

A method of receiving data according to embodiments of the present invention is performed by a timing controller configured to communicate with a host through a plurality of lanes. The method includes: receiving, by a first reception unit, first data through a first lane; receiving, by a second reception unit, second data through a second lane; detecting a skew between the first lane and the second lane by comparing the first data and the second data; recovering, by the first reception unit, a first clock and first payload data from the first data using a first clock data recovery unit; and recovering, by the second reception unit, a second clock and second payload data from the second data using a second clock data recovery unit. The detecting of the skew includes controlling a loop speed of the first clock data recovery unit based on a skew level of the skew.

According to one embodiment, the detecting of the skew may further include: by comparing the first data and the second data, determining a slow lane of the first lane and the second lane and in which data transmission is relatively delayed; and providing information about the skew level to a reception unit of the first reception unit and the second reception unit and connected to the slow lane.

According to one embodiment, when the first lane is determined as the slow lane, by controlling the loop speed, a phase of the first payload data may be shifted to be the same as a phase of the second payload data.

According to one embodiment, the recovering of the first clock and the first payload data may include: outputting a clock having a frequency according to a control signal using an oscillator; comparing the first data and the clock using a phase detector; and adjusting the control signal based on an output of the phase detector and the skew level.

According to one embodiment, the adjusting of the control signal may include: outputting a first analog signal proportional to the output of the phase detector using a first digital-to-analog converter; integrating the output of the phase detector using an integrator; and converting an output of the integrator into a second analog signal using a second digital-to-analog converter. The first analog signal and the second analog signal may be included in the control signal, and the outputting of the first analog signal may include adjusting at least one among a step of the first digital-to-analog converter, a gain of the first digital-to-analog converter, and the output of the phase detector provided to the first digital-to-analog converter based on the skew level.

DETAILED DESCRIPTION

Figure 1:
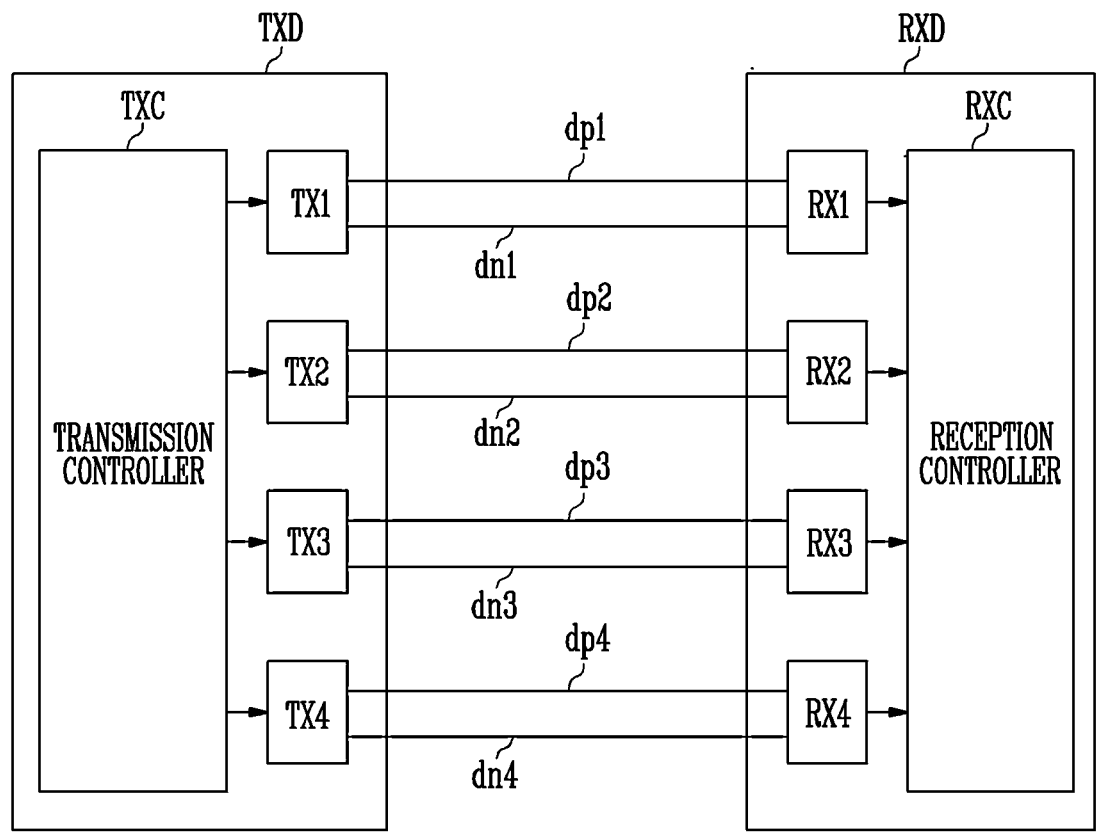
FIGS. 1 and 2 are diagrams illustrating a data transceiver according to embodiments of the present invention.

Various embodiments of the present invention will be described with reference to the accompanying drawings to the extent that those who skilled in the art can easily implement. The present invention may be achieved in various forms and not limited to the following embodiments.

In addition, parts irrelevant to description are omitted in the drawings in order to clearly explain the present invention. The same reference numerals are allocated to the same or similar components throughout this specification. Therefore, previously described reference numerals may be used in other drawings.

Also, since sizes and thicknesses of components in drawings are arbitrarily shown for convenience of description, the sizes and thicknesses are not limited thereto.

In addition, in the description, the expression "the same" may refer to "substantially the same." That is, the term "the same" may refer to sameness enough to convince a person of ordinary skill in the art. Other expressions may be expressions from which the term "substantially" is omitted.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the present invention. Further, the blocks, units, and/or modules of some exemplary embodiments may be physically combined into more complex blocks, units, and/or modules without departing from the scope of the present invention.

Figure 2:
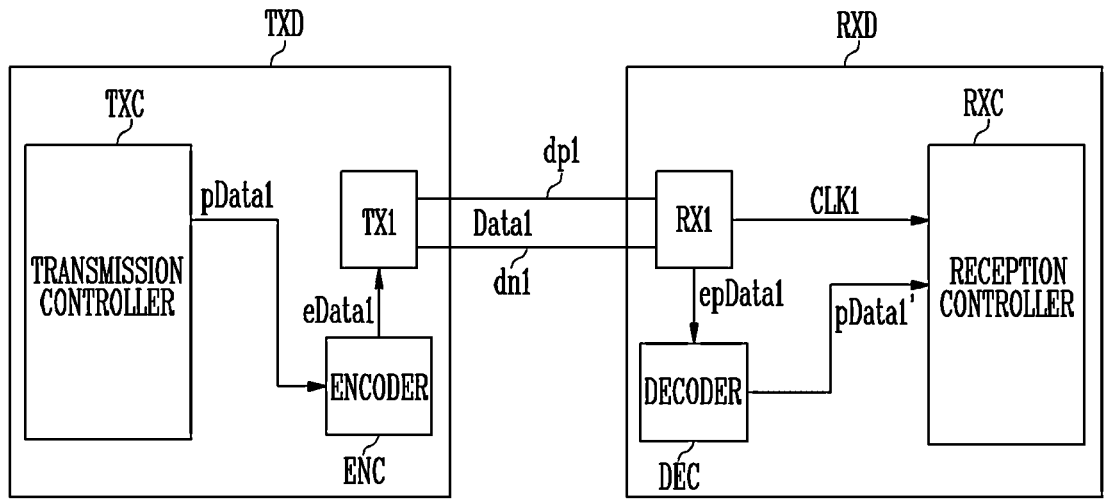

FIGS. 1 and 2 are diagrams illustrating a data transceiver according to embodiments of the present invention.

Referring first to FIG. 1, a transceiver TSCV may include a transmitter TXD (or a data transmitter) and a receiver RXD (or a data receiver).

The transmitter TXD may include a transmission controller TXC and a plurality of data transmission units TX1, TX2, TX3, and TX4. The receiver RXD may include a reception controller RXC and a plurality of data reception units RX1, RX2, RX3, and RX4.

A first data transmission unit TX1 may be connected to a first data reception unit RX1 through a first lane LANE1. The first lane LANE1 may include a first line dp1 and a second line dn1. The first data transmission unit TX1, the first lane LANE1, and the first data reception unit RX1 may be referred to as a first data channel. A second data transmission unit TX2 may be connected to a second data reception unit RX2 through a second lane LANE2. The second lane LANE2 may include a first line dp2 and a second line dn2. The second data transmission unit TX2 and the second data reception unit RX2 may be referred to as a second data channel. A third data transmission unit TX3 may be connected to a third data reception unit RX3 through a third lane LANE3. The third lane LANE3 may include a first line dp3 and a second line dn3. The third data transmission unit TX3 and the third data reception unit RX3 may be referred to as a third data channel. A fourth data transmission unit TX4 may be connected to a fourth data reception unit RX4 through a fourth lane LANE4. The fourth lane LANE4 may include a first line dp4 and a second line dn4. The fourth data transmission unit TX4 and the fourth data reception unit RX4 may be referred to as a fourth data channel.

The plurality of data transmission units TX1, TX2, TX3, and TX4 and the plurality of data reception units RX1, RX2, RX3, and RX4 may correspond to a physical layer and a data link layer of an open system interconnection ("OSI") 7-layer model, may correspond to a network interface of a transmission control protocol/internet protocol ("TCP/IP"), or may correspond to a physical layer of a mobile industry processor interface (MIPI) protocol. The physical layer of the MIPI protocol may be formed according to various preset specifications such as D-PHY, C-PHY, and M-PHY specifications. Hereinafter, a case in which the plurality of data transmission units TX1, TX2, TX3, and TX4 and the plurality of data reception units RX1, RX2, RX3, and RX4 are formed according to the D-PHY specification of the physical layer of the MIPI protocol will be described as an example.

The transmission controller TXC and the reception controller RXC correspond to a network layer and a transport layer of the OSI-7 layer model, may correspond to the Internet and transport of the TCP/IP protocol, or may correspond to a protocol layer of the MIPI protocol. The protocol layer of the MIPI protocol may be formed according to various predefined specifications such as display serial interface ("DSI") and a camera serial interface ("CSI") specification. Hereinafter, a case in which the transmission controller TXC and the reception controller RXC are formed according to the DSI specification of the protocol layer of the MIPI protocol will be described as an example.

The transmission controller TXC and the plurality of data transmission units TX1, TX2, TX3, and TX4 may be components separately from each other in hardware or may be components of which at least two or more thereof are integrated in hardware. The transmitter TXC and the plurality of data transmission units TX1, TX2, TX3, and TX4 may be components separately from each other in software or may be components of which at least two or more are integrated in software. The transmitter TXD may be provided as a part (hardware or software) of another controller (for example, an application processor ("AP"), a graphics processing unit ("GPU"), a central processing unit ("CPU"), or the like) and may also be provided as independent hardware (for example, a transmission-dedicated integrated circuit ("IC")).

The reception controller RXC and the plurality of data reception units RX1, RX2, RX3, and RX4 may be components separately from each other in hardware or may be components of which at least two or more are integrated in hardware. The reception controller RXC and the plurality of data reception units RX1, RX2, RX3, and RX4 may be components separately from each other in software or may be components of which at least two or more thereof are integrated in software. The receiver RXD may be provided as a part (hardware or software) of another controller (for example, a timing controller ("TCON"), a TCON embedded driver ("TED") IC, a driver IC ("D-IC"), or the like) may be provided as independent hardware (for example, a reception-dedicated IC).

The transceiver TSCV of FIG. 1 may include four data channels, and the four data channels may transmit and receive pieces of data independent of each other.

In FIG. 1, the plurality of data transmission units TX1, TX2, TX3, and TX4 may be substantially the same or similar to each other, and the plurality of data reception units RX1, RX2, RX3, and RX4 may be substantially the same or similar to each other. In FIG. 2, the transceiver TSCV is briefly illustrated based on the first data transmission unit TX1 and the first data reception unit RX1.

The transmitter TXD may further include an encoder ENC. The receiver RXD may further include a decoder DEC.

The transmission controller TXC may provide first payload data pData1 (or payload data) to the encoder ENC. The encoder ENC may encode the first payload data pData1 to generate first encoded data eData1 and provide the first encoded data eData1 to the first data transmission unit TX1. The first data transmission unit TX1 may generate first data Data1 by adding other data before and behind the first encoded data eData1 according to a preset protocol. The first data transmission unit TX1 may transmit the first data Data1.

The first data reception unit RX1 may generate a clock signal using the first data Data1, and may sample the first data Data1 (or first encoded payload data epData1) based on the generated clock signal. For example, the first data reception unit RX1 may include a clock data recovery unit circuit (or a clock data recovery unit). The first data reception unit RX1 may provide the first encoded payload data epData1 to the decoder DEC. The decoder DEC may decode the first encoded payload data epData1 to generate first payload data pData1' and provide the first payload data pData1' to the reception controller RXC.

The embodiment of FIG. 2 may also be applied to other data channels of FIG. 1. For example, the transmitter TXD may include encoders corresponding to the second to fourth data transmission units TX2, TX3, and TX4, respectively. The receiver RXD may include decoders corresponding to the second to fourth data reception units RX2, RX3, and RX4, respectively.

Figure 3:
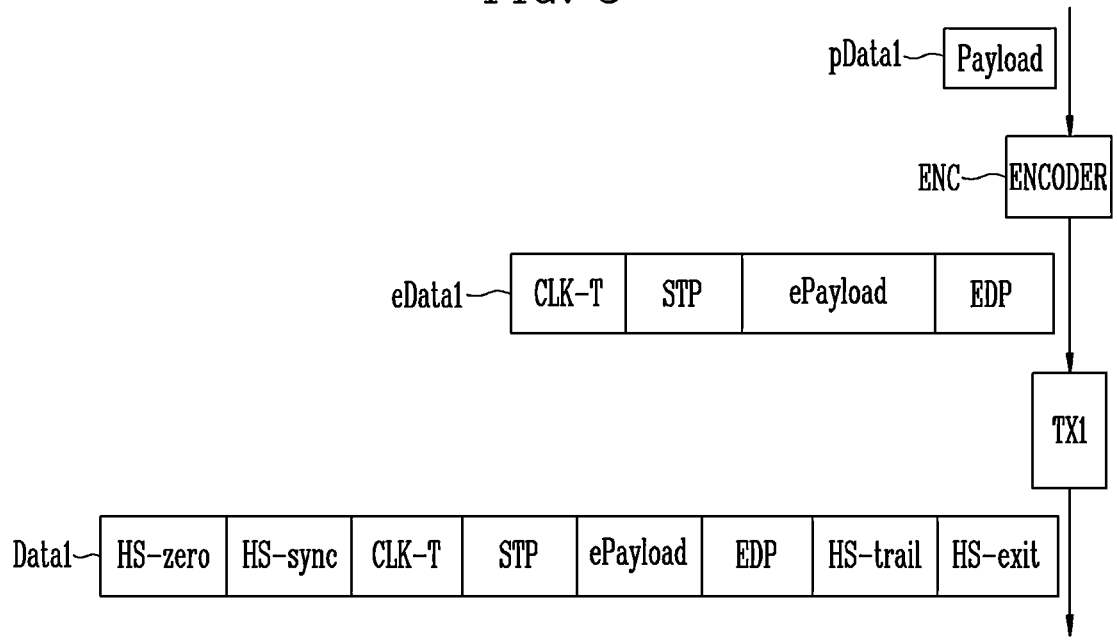
FIGS. 3 and 4 are diagrams for describing the operation of a transmitter included in the data transceiver of FIG. 2.
Figure 4:
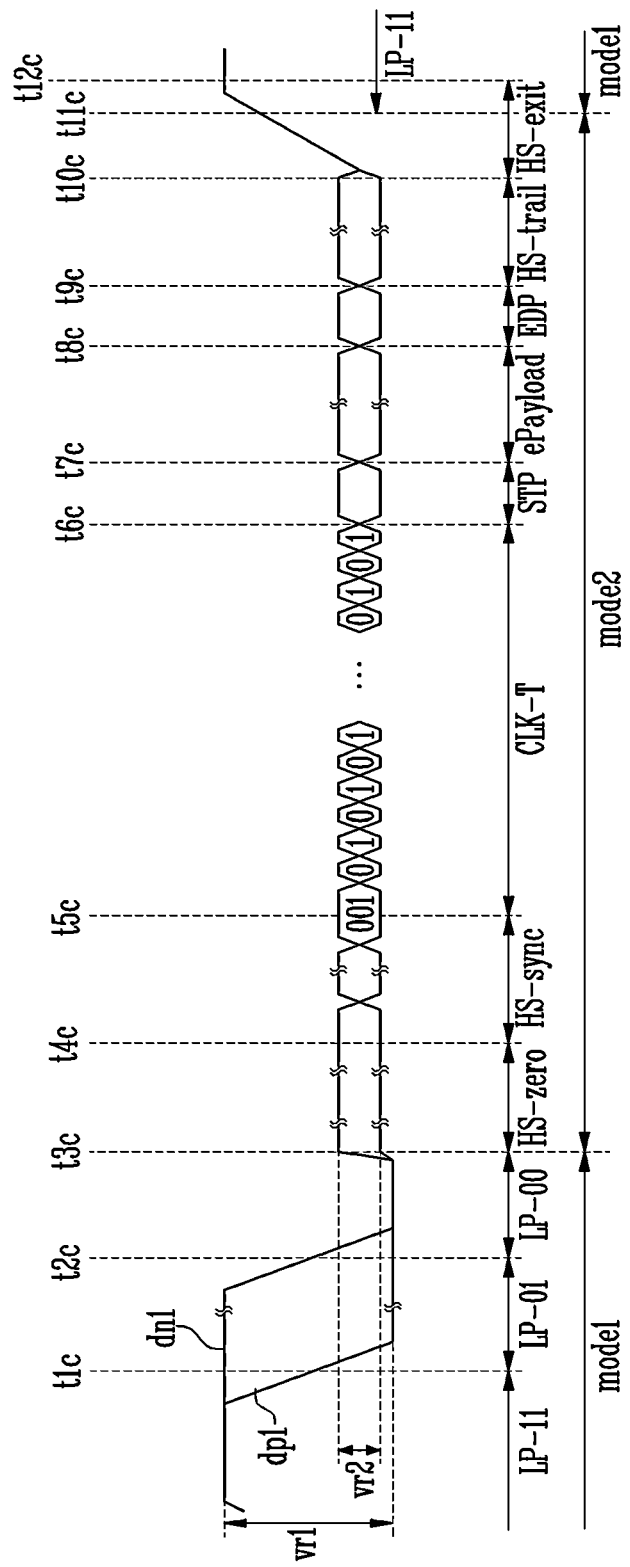

FIGS. 3 and 4 are diagrams for describing the operation of the transmitter included in the data transceiver of FIG. 2.

First, referring to FIGS. 2 and 3, the encoder ENC may receive first payload data pData1. The encoder ENC may encode the first payload data pData1 to generate encoded payload data ePayload and may add data before and behind the encoded payload data ePayload to generate first encoded data eData1. For example, the first encoded data eData1 may sequentially include a clock training pattern CLK-T, a start pattern STP, the encoded payload data ePayload, and an end pattern EDP.

The clock training pattern CLK-T may include clock information. For example, the clock training pattern CLK-T may repeatedly include 1 and 0 to indicate a frequency and phase of a clock signal (or a clock) (for example, 01010101 . . . ). As another example, the clock training pattern CLK-T may repeatedly include a plurality of consecutive 0 and a plurality of consecutive 1 to indicate a frequency and phase of a clock signal (for example, 0000111100001111 . . . ). The number of repetitions of 0 and the number of repetitions of 1 in the clock training pattern CLK-T may vary according to embodiments.

The start pattern STP may be a pattern notifying that transmission of the encoded payload data ePayload is started. The start pattern STP may be a pattern that cannot be included in the encoded first payload ePayload (that is, is disabled). For example, the start pattern STP may be formed of 24b'011100_000000_111111_110001'.

The encoded payload data ePayload may include clock information. For example, where many consecutive 0 or many consecutive 1 in the encoded payload data ePayload, since a signal transition is decreased, the first data reception unit RX1 may not sufficiently perform a phase correction of a clock signal, and the clock signal may be skewed. Accordingly, the encoder ENC may encode the encoded payload data ePayload so as to transition (change from 0 to 1 or from 1 to 0) more sufficiently as compared with the payload data pDATA1. The encoder ENC may encode the encoded payload data ePayload so as to periodically have bits according to a specific rule.

The end pattern EDP may be a pattern notifying that transmission of the encoded payload data ePayload is ended. For example, the end pattern EDP may be formed of 24b'011100_111111_000000_110001'. The end pattern STP may be a pattern that cannot be included in the encoded first payload ePayload (that is, is disabled).

The first data transmission unit TX1 may receive the first encoded data eData1. The first data transmission unit TX1 may add other data before and behind the first encoded data eData1 according to a preset protocol to generate and transmit first data Data1. For example, when the preset protocol is an MIPI protocol, the first data transmission unit TX1 may sequentially transmit a first code HS-zero, a second code HS-sync, the first encoded data eData1, a third code HS-trail, and a fourth code HS-exit.

Referring to FIG. 4, the transmitter TXD (in particular, the first data transmission unit TX1) may transmit signals having a first voltage range vr1 to the first lane LANE1 in a first mode model. The transmitter TXD may transmit signals having a second voltage range vr2 less than the first voltage range vr1 to the first lane LANE1 in a second mode model.

In an embodiment, for example, an upper limit of the first voltage range vr1 may be greater than an upper limit of the second voltage range vr2, and a lower limit of the first voltage range vr1 may be less than a lower limit of the second voltage range vr2. When an MIPI protocol is applied to the transceiver TSCV, the first mode model may be a low power mode LP, and the second mode model may be a high speed mode HS.

In the first mode model, the first lane LANE1 may be used in a single-ended manner. That is, in the first mode model, signals transmitted to the first line dp1 and the second line dn1 may be the same or different. In the second mode model, the first line dp1 and the second line dn1 may be used in a differential manner. That is, in the second mode model, signals transmitted to the first line dp1 and the second line dn1 may be different. The first line dp1 may be a positive line, and the second line dn1 may be a negative line.

When the transmitter TXD transmits the first data Data1 to the receiver RXD, the transmitter TXD may be driven in the order of the first mode model, the second mode model, and the first mode model and may transmit the first data Data1 (that is, the clock training pattern CLK-T and the encoded payload data ePayload) in the second mode model.

In order to notify that the transmitter TXD is converted from the first mode model to the second mode model, the transmitter TXD may transmit predefined patterns (for example, a first pattern LP-11, a second pattern LP-01, and a third pattern LP-00 to the first lane LANE1.

In an embodiment, for example, before a first time point t1c, the transmitter TXD may maintain signals applied to the first line dp1 and the second line dn1 at a logic high level (that is, the first pattern LP). When a voltage level of a signal is greater than a first predefined threshold voltage level, the voltage level of the signal may be determined as a logic high level, and when a voltage level of a signal is less than a predefined second threshold voltage level, the voltage level of the signal may be determined as a logic low level. Next, at the first time point t1c, the transmitter TXD may change the signal of the first line dp1 to a logic low level and may maintain the signal of the second line dn1 at a logic high level (that is, the second pattern LP-01). Subsequently, at a second time point t2c, the transmitter TXD may maintain the signal of the first line dp1 at a logic low level and may change the signal of the second line dn1 to a logic low level (that is, the third pattern LP-00).

Then, in the second mode mode1, the first transmitter TXD may sequentially transmit the first code HS-zero, the second code HS-sync, the first encoded data eData1, the third code HS-trail, and the fourth code HS-exit. For example, the transmitter TXD may transmit the first code HS-zero during a period between a third time point t3c and a fourth time point t4c, transmit the second code HS-sync during a period between the fourth time point t4c and a fifth time point t5c, transmit the clock training pattern CLK-T during a period between the fifth time point t5c and a sixth time point t6c, transmit the start pattern STP during a period between the sixth time point t6c and a seventh time point t7c, transmit the encoded payload data ePayload during a period between the seventh time point t7c and an eighth time point t8c, transmit the end pattern EDP during a period between the eighth time point t8c and a ninth time point t9c, transmit the third code HS during a period between the ninth time point t9c and a tenth time point t10c, and transmit the fourth code HS-exit after the tenth time point t10c.

The first code HS-zero may be a pattern for providing notification of a waiting period after entering from the first mode mode1 to the second mode mode1. For example, the first code HS-zero may be a pattern in which 0 is repeated.

The second code HS-sync may be a pattern notifying that transmission of the first encoded data eData1 is stated. For example, the second code HS-sync may have a value of OxB8h or a value of 00011101.

The third code HS-trail may be a pattern notifying that transmission of the first encoded data eData1 is started. The third code HS-trail may be a pattern in which a value opposite to last data of the first encoded data eData1 is repeated. For example, when the last data (bit) of the first encoded data eData1 is 0, the third code HS-trail may be a pattern in which 1 is repeated. For example, when the last data (bit) of the first encoded data eData1 is 1, the third code HS-trail may be a pattern in which 0 is repeated.

The fourth code HS-exit may be a pattern notifying that the second mode mode1 is ended and the first mode mode1 is started. The fourth code HS-exit may not be formed of a specific bit but may be a transitional pattern in which a voltage is increased to exceed the second voltage range vr2.

From an eleventh time point t11c, the transmitter TXD may change the signals applied to the first line dp1 and the second line dn1 to a logic high level (that is, the first pattern LP-11). Accordingly, the transmitter TXD may notify that the second mode mode1 is ended and the first mode mode1 is started.

The receiver RXD may generate a clock signal using the clock training pattern CLK-T and the encoded payload data ePayload. The first data reception unit RX1 may include a clock data recovery unit circuit and may generate a clock signal having a specific frequency and phase using the clock training pattern CLK-T. In addition, the first data reception unit RX1 may continuously correct a phase of a clock signal using the encoded payload data ePayload to prevent a skew of the clock signal. The first data reception unit RX1 may sample received data using the generated clock signal. Accordingly, according to the present embodiment, there may be provided the transceiver TSCV capable of performing communication using an MIPI protocol without a clock line.

Figure 5:
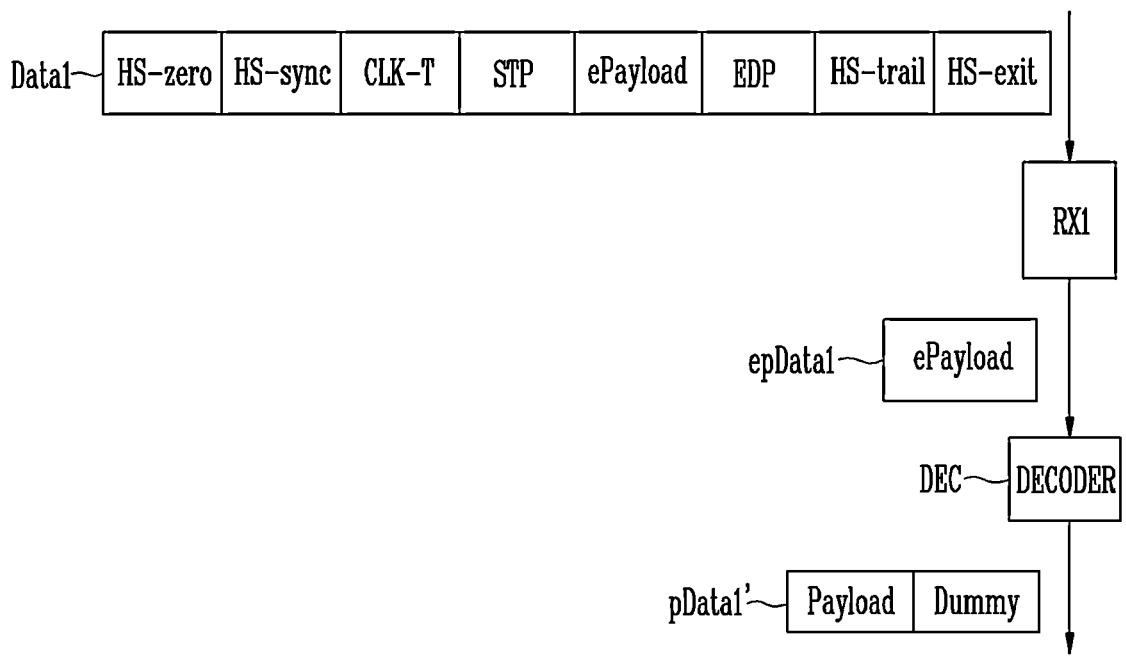
FIG. 5 is a diagram for describing the operation of a receiver included in the transceiver of FIG. 2.

FIG. 5 is a diagram for describing the operation of the receiver included in the transceiver of FIG. 2.

Referring to FIGS. 2 to 5, the first data reception unit RX1 may receive first data Data1 and may provide first encoded payload data epData1 in the first data Data1 (or coded payload data ePayload) to the decoder DEC.

The decoder DEC may decode the first encoded payload data epData1 to generate first payload data pData1' and provide the generated first payload data pData1' to the reception controller RXC. The first payload data pData1' may include payload data Payload and a dummy pattern Dummy. The payload data Payload may be the same as the payload data Payload provided by the transmission controller TXC.

The dummy pattern Dummy may be pre-encoded to be included in the encoded payload data ePayload by the encoder ENC or may be added by the decoder DEC. The dummy pattern may be data in which the same value is repeated. For example, when a last value of the payload data Payload is 0, the dummy pattern Dummy may be data in which 1 is repeated, and when the last value of the payload data Payload is 1, the dummy pattern Dummy may be data in which 0 is repeated.

Figure 6:
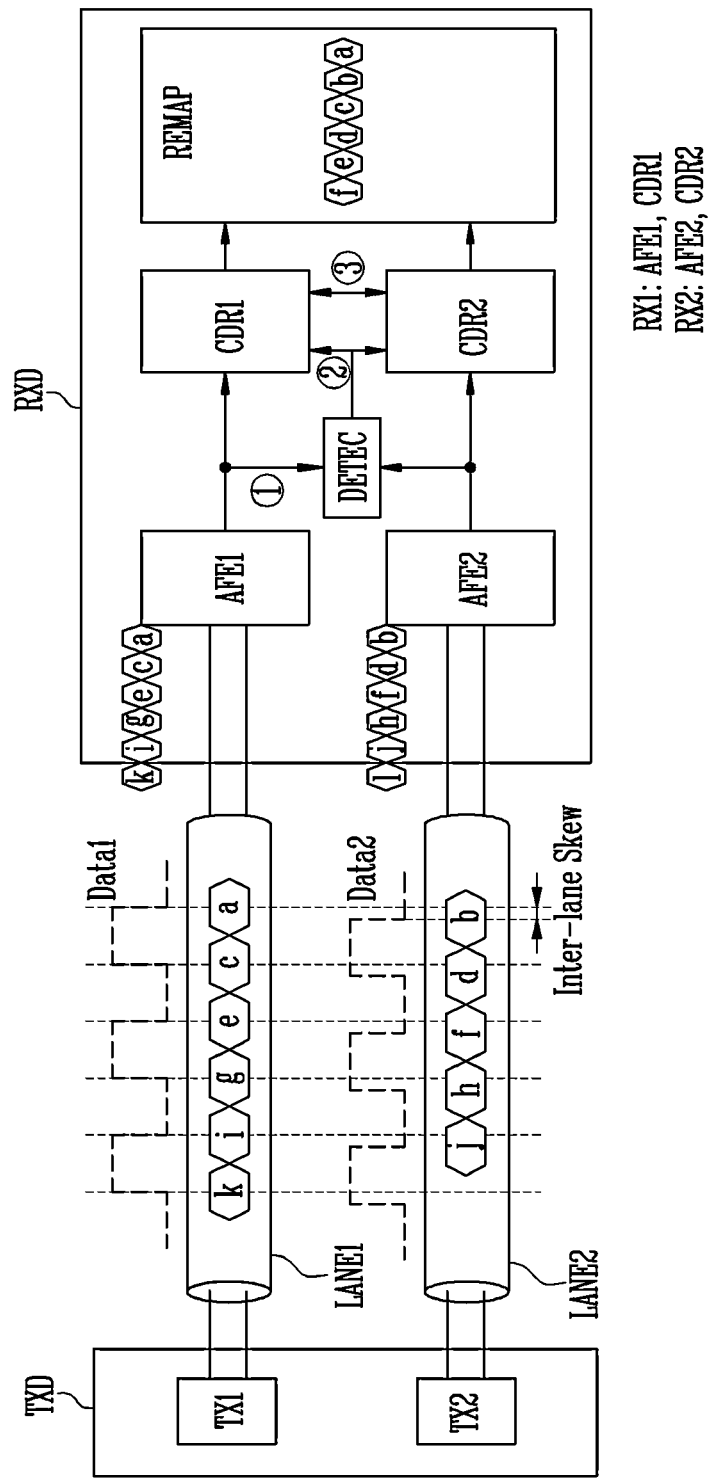
FIG. 6 is a diagram illustrating one embodiment of the data transceiver of FIG. 1.
Figure 7:
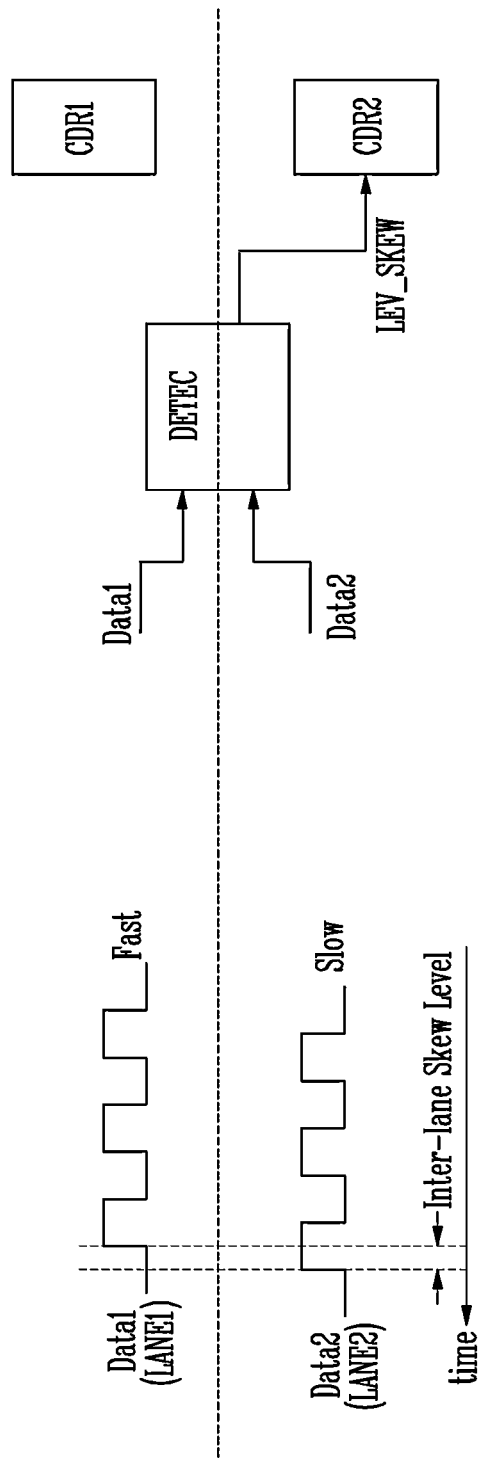
FIG. 7 is a diagram for describing the operation of a detector included in the data transceiver of FIG. 6.

FIG. 6 is a diagram illustrating one embodiment of the data transceiver of FIG. 1. FIG. 7 is a diagram for describing the operation of a detector included in the data transceiver of FIG. 6.

Referring to FIGS. 1 and 6, in order to describe a skew (or an inter-lane skew) between a first lane LANE1 and a second lane LANE2 and a correction (or a calibration) of the skew, a transceiver TSCV is briefly illustrated based on the first and second lanes LANE1 and LANE2.

A transmitter TXD may transmit data through the first and second lanes LANE1 and LANE2. For example, the transmitter TXD may transmit first data Data1 (or a first data signal) through a first data transmission unit TX1 and simultaneously may transmit second data Data2 (or a second data signal) through a second data transmission unit TX2. For example, the first data Data1 may include odd-numbered bits (a, c, e, g, i, and k bits or bit strings) of source data or a signal corresponding thereto, and the second data Data2 may include even-numbered bits (b, d, f, h, j, and l bits or bit strings) of the source data or a signal corresponding thereto.

A skew may occur due to an asymmetric design of the first and second lanes LANE1 and LANE2. Here, the skew means that signals having the same phase provided to the first and second lanes LANE1 and LANE2 are misaligned at an arrival point (that is, at a receiver RXD), and the signals arriving at the receiver RXD with a time difference may be also referred to as a timing skew. For example, a timing at which the receiver RXD receives the second data Data2 (for example, the b bit or bit string) through the second lane LANE2 may be later than a timing at which the receiver RXD receives the first data Data1 (for example, the bit or bit string) through the first lane LANE1.

In embodiments, the receiver RXD may detect a skew by comparing the first data Data1 and the second data Data2, may determine a slow lane of the first lane LANE1 and the second lane LANE2 and in which data transmission is relatively delayed (and a fast lane in which data transmission is relatively fast), and may adjust a loop speed (or a bandwidth) of a clock data recovery unit connected to the slow lane. Therefore, the receiver RXD may correct or calibrate a skew between the first lane LANE1 and the second lane LANE2. For reference, the clock data recovery unit may include a loop circuit which tracks data (for example, the first data Data1 or the second data Data2) to recover or generate a clock signal having a specific frequency and phase (for example, the same frequency and phase as a clock training pattern of data). A loop speed may be defined as a speed at which, in a process of recovering a clock signal, a frequency and/or phase of the clock signal is changed by the loop circuit. A bandwidth of the clock data recovery unit may refer to a range in which a frequency of a clock signal is variable.

The receiver RXD may include a first data reception unit RX1, a second data reception unit RX2, a detector DETEC (detection unit or phase detector), and a remapper REMAP (or a remapping unit). The first data reception unit RX1 may include a first analog front end AFE1 and a first clock data recovery unit CDR1. The second data reception unit RX2 may include a second analog front end AFE2 and a second clock data recovery unit CDR2. Since the second data reception unit RX2 (for example, the second analog front end AFE2 and the second clock data recovery unit CDR2) is substantially the same or similar to the first data reception unit RX1 (for example, the first analog front end AFE1 and the first clock data recovery unit CDR1), the first data reception unit RX1 will be mainly described.

The first analog front end AFE1 may amplify the first data Data1 in a specific frequency band or filter noise (for example, high frequency noise) of the first data Data1. The first analog front end AFE1 may compensate for signal distortion generated in a process of transmitting the first data Data1 at a high speed through the first lane LANE1.

The detector DETEC may sense (or detect) a skew by comparing the first data Data1 and the second data Data2, may determine a slow lane and a fast lane based on the skew, and may provide a level of the skew (hereinafter, referred to as "skew level") (or information about the skew level) to a clock data recovery unit (for example, the first clock data recovery unit CDR1 or the second clock data recovery unit CDR2) connected to the slow lane. Here, the slow lane may refer to a lane in which data transmission is relatively delayed or slow, and the fast lane may refer to a lane in which data transmission is relatively fast.

The detector DETEC may be implemented as a phase detector (or a phase comparator). For example, the detector DETEC may compare a first phase of the first data Data1 and a second phase of the second data Data2 and output a signal corresponding to a phase difference between the first phase and the second phase. The skew level may correspond to a phase difference between the first phase and the second phase.

Referring to FIG. 7, for example, the second phase of the second data Data2 transmitted through the second lane LANE2 may lag the first phase of the first data Data1. In this case, the detector DETEC may determine the first lane LANE1 as a fast lane and determine the second lane LANE2 as a slow lane. In addition, the detector DETEC may provide information about a skew level LEV_SKEW to the second clock data recovery unit CDR2 connected to the second lane LANE2 that is the slow lane.

Referring again to FIG. 6, the first clock data recovery unit CDR1 may recover a first clock signal and first payload data (or first encoded payload data epData1 (see FIGS. 2 and 5)) from the first data Data1. Furthermore, when the first clock data recovery unit CDR1 receives the information about the skew level LEV_SKEW, the first clock data recovery unit CDR1 may adjust a loop speed based on the skew level LEV_SKEW. That is, the loop speed of the first clock data recovery unit CDR1 may be controlled based on the skew level LEV_SKEW.

When the loop speed of the first clock data recovery unit CDR1 is increased, the first clock data recovery unit CDR1 may enters a locked state relatively quickly, and the first data Data1 (or the first clock signal and the first payload data restored by the first clock data recovery unit CDR1) may be shifted such that a phase thereof becomes faster. Here, the locked state may refer to a state in which the first clock data recovery unit CDR1 generates a clock signal having a locked frequency and a locked phase. For example, according to the operation of the first clock data recovery unit CDR1, a frequency of a clock signal may be changed from an initial frequency to a target frequency and then may be locked to the target frequency. As a loop speed is increased, the frequency of the clock signal may more quickly reach the target frequency. For example, in a state in which a frequency of a clock signal is locked, the first clock data recovery unit CDR1 may shift a phase of the clock signal to lock a specific phase, and according to a loop speed (or a skew level), the phase of the clock signal may be locked in a state that leads a target phase (that is, a phase to be locked when the skew level is not taken into account).

In an embodiment, for example, when the second lane LANE2 is a slow lane, a loop speed of the second clock data recovery unit CDR2 may be increased due to the skew level LEV_SKEW, and the phase of the second data Data2 may be shifted to be the same as the phase of the data Data1.

In one embodiment, the first clock data recovery unit CDR1 may use a proportional integral (PI) control technique, or the first clock data recovery unit CDR1 may be implemented as a PI-clock data recovery unit. In this case, the first clock data recovery unit CDR1 may adjust a proportional gain of the PI control technique based on a skew level. A configuration for adjusting the proportional gain will be described below with reference to FIGS. 10A and 10B.

The remapper REMAP may re-arrange (reconstitute or remap) the first data Data1 and the second data Data2 to recover the source data. The remapper REMAP may be implemented as a deserializer, a serializer, or the like.

As described above, the receiver RXD may detect a skew by comparing the first data Data1 and the second data Data2 transmitted through the first and second lanes LANE1 and LANE2, respectively, and may control a loop speed (or a bandwidth) of a clock data recovery unit connected to a slow lane (in which data transmission is relatively delayed or slow among the first and second lanes LANE1 and LANE2) based on a skew level of the skew. A phase of data transmitted through the slow lane (or recovered by the clock data recovery unit) may be shifted so that phases of the first and second data Data1 and Data2 may be the same, or the skew may be corrected.

Figure 8:
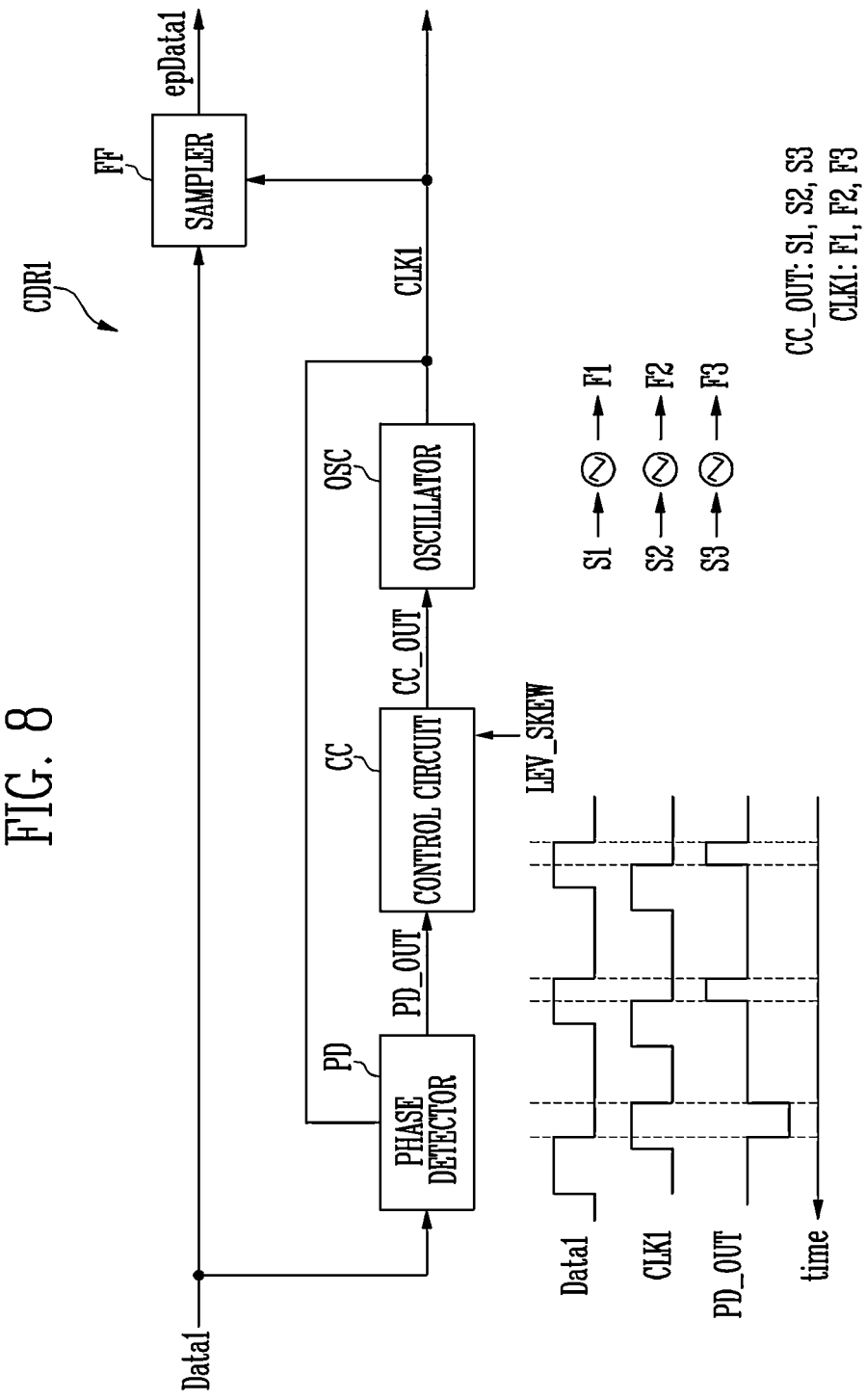
FIG. 8 is a diagram illustrating one embodiment of a clock data recovery unit included in the data transceiver of FIG. 6.

FIG. 8 is a diagram illustrating one embodiment of the clock data recovery unit included in the data transceiver of FIG. 6.

Referring to FIGS. 6 and 8, a first clock data recovery unit CDR1 may include a phase detector PD (or a phase frequency detector), a control circuit CC, and an oscillator OSC. The phase detector PD, the control circuit CC, and the oscillator OSC may constitute a loop (or a loop circuit). In addition, the first clock data recovery unit CDR1 may further include a sampler FF.

The phase detector PD may compare first data Data1 and a first clock signal CLK1 (or a clock signal). Here, the first clock signal CLK1 may be provided from the oscillator OSC. For example, the phase detector PD may detect a phase difference by comparing the first data Data1 and the first clock signal CLK1 (or the clock signal) and may output an output PD_OUT corresponding to the phase difference. For example, when a phase of the first data Data1, which is a reference clock (or has a target frequency and a target phase), leads a phase of the first clock signal CLK1, the output PD_OUT of the phase detector PD may include an up signal, and when the phase of the first clock signal CLK1 leads the phase of the first data Data1, the output PD_OUT of the phase detector PD may include a down signal.

The control circuit CC may generate a control signal CC_OUT based on the output PD_OUT of the phase detector PD. For example, the control circuit CC may push/pull electric charges at a pulse width ratio of the output PD_OUT (for example, an up/down signal) of the phase detector PD to generate the control signal CC_OUT. When the oscillator OSC is implemented as a voltage-controlled oscillator (VCO), the control signal CC_OUT may be a voltage. When the oscillator OSC is implemented as a current-controlled oscillator, the control signal CC_OUT may be a current. In addition, the control circuit CC may have a low filter function and may remove noise generated in a loop (that is, the loop including the phase detector PD, the control circuit CC, and the oscillator OSC). That is, the control circuit CC may perform functions of a charge pump and a loop filter.

The oscillator OSC may output the first clock signal CLK1 having a frequency according to the control signal CC_OUT. For example, when the control signal CC_OUT has a first value S1 (for example, 1.9 voltages (V)), the oscillator OSC may output the first clock signal CLK1 having a first frequency F1 (for example, 490 megahertz (MHz)). For example, when the control signal CC_OUT has a second value S2 (for example, 2.0 V), the oscillator OSC may output the first clock signal CLK1 having a second frequency F2 (for example, 500 MHz). For example, when the control signal CC_OUT has a third value S3 (for example, 2.1 V), the oscillator OSC may output the first clock signal CLK1 having a third frequency F3 (for example, 510 MHz).

When a frequency and phase of the first clock signal CLK1 are substantially the same as a frequency and phase of the first data Data1, the clock data recovery unit CDR may be in a locked state. In this case, the first clock signal CLK1 may be provided to the sampler FF, and the sampler FF may sample the first data Data1 based on the first clock signal CLK1. For example, the sampler FF may sample the first data Data1 in response to an edge (for example, a rising edge and/or a falling edge) of the first clock signal CLK1. For example, the sampler FF may recover encoded payload data epData1 (or payload data) from the first data Data1.

In embodiments, the control circuit CC may adjust a change rate (or a loop speed) of the control signal CC_OUT based on a skew level LEV_SKEW.

As the change rate of the control signal CC_OUT is increased or a loop speed of the first clock data recovery unit CDR1 is increased, the first clock signal CLK1 may be quickly changed from an initial frequency to a target frequency, that is, the first clock signal CLK1 may be more quickly recovered, and a state of the first clock data recovery unit CDR1 may be more quickly converted from an unlocked state to a locked state (that is, a state in which a data recovery unit operation is possible). Accordingly, the recovery of the first encoded payload data epData1 may be relatively fast, a phase of the first encoded payload data epData1 (or the first data Data1) may be shifted, and a skew between a first lane LANE1 and a second lane LANE2 may be corrected.

Figure 9:
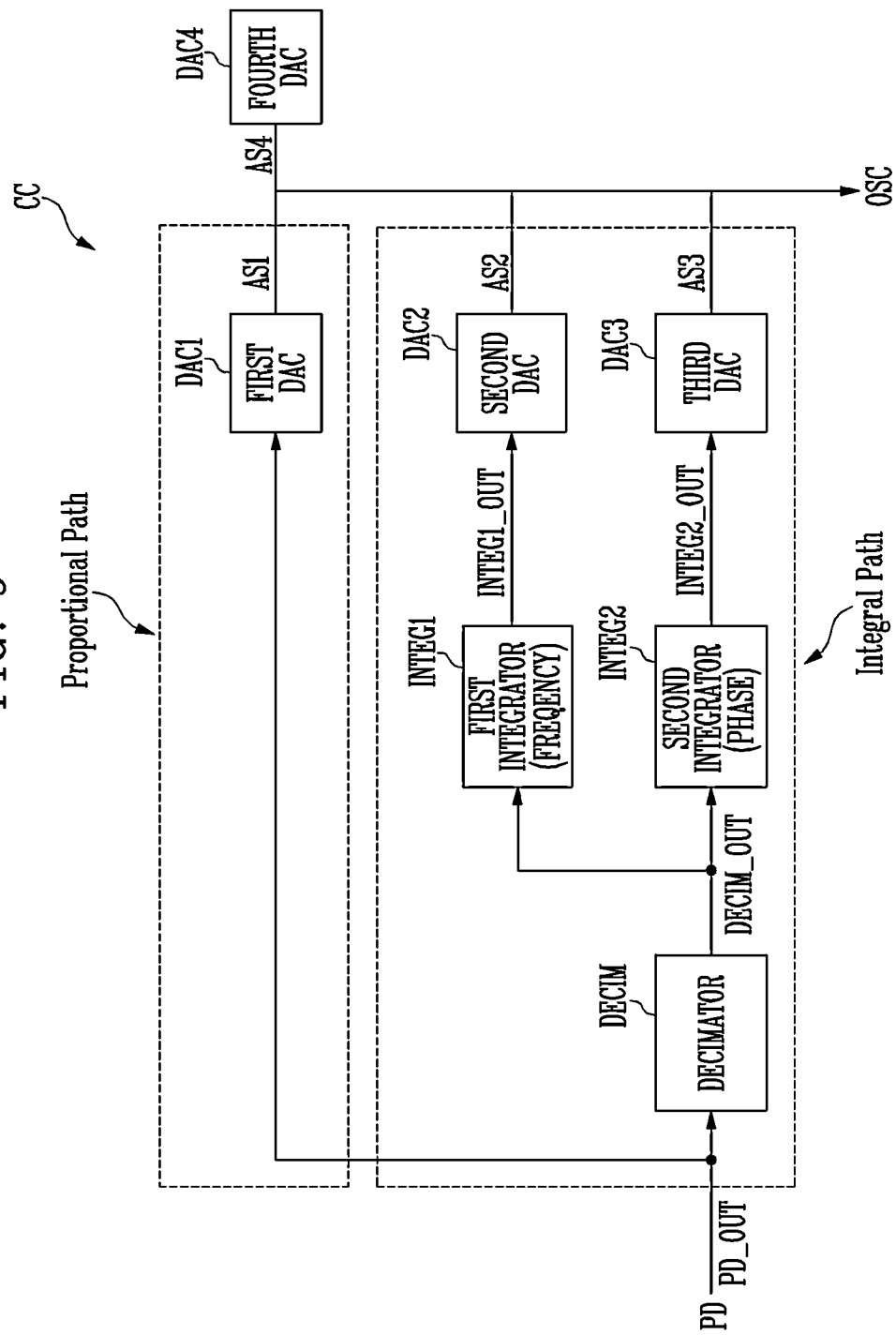
FIG. 9 is a diagram illustrating one embodiment of a control circuit included in the clock data recovery unit of FIG. 8.
Figure 10A:
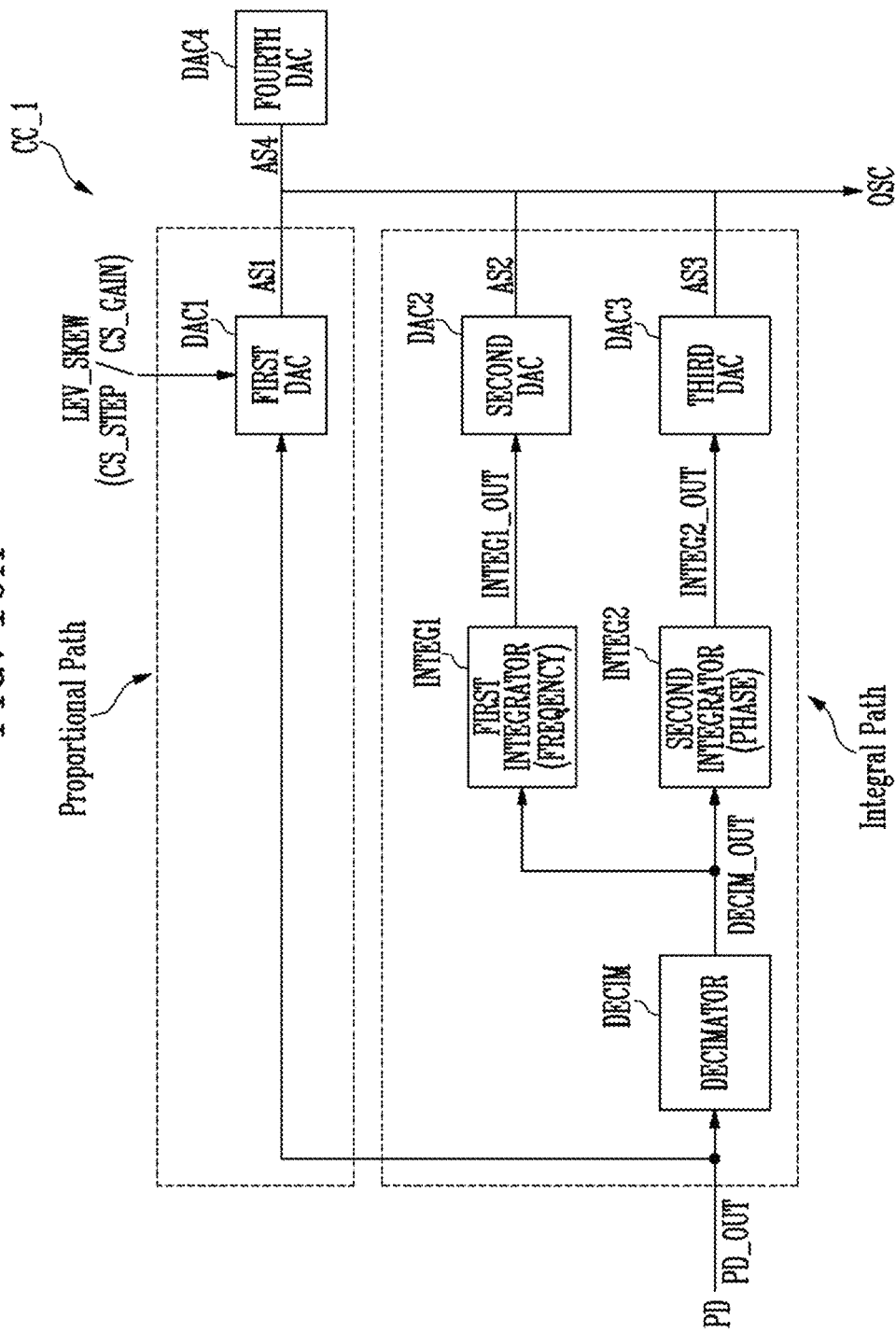
FIGS. 10A and 10B are diagrams illustrating other embodiments of a control circuit included in the clock data recovery unit of FIG. 8.
Figure 10B:
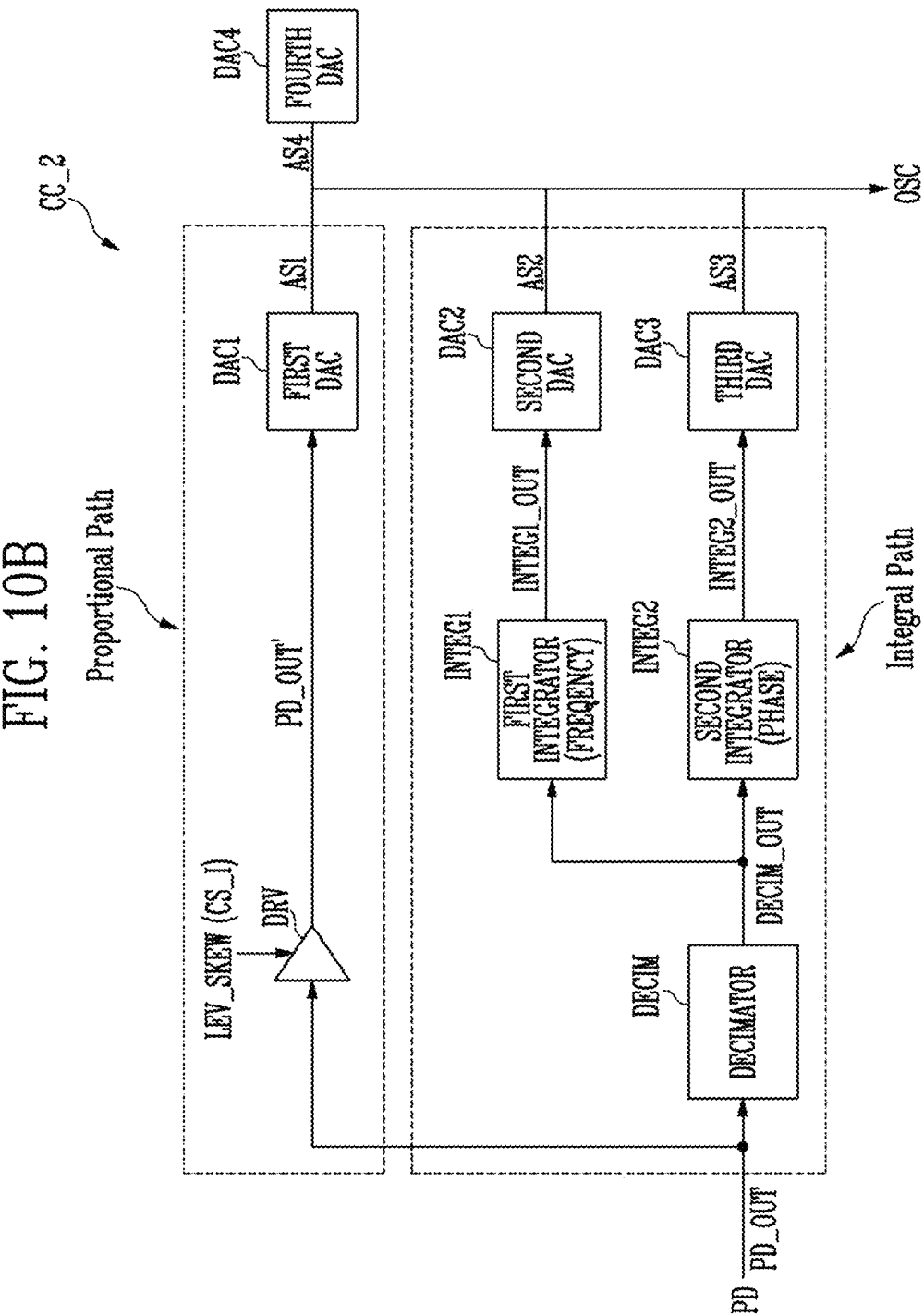
Figure 10C:
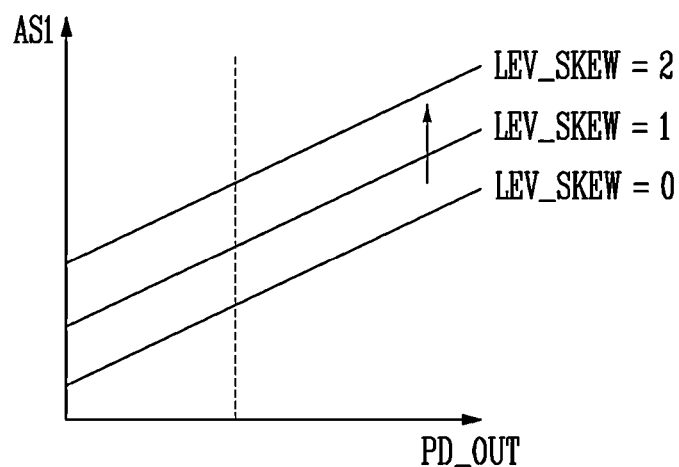
FIG. 10C is a diagram for describing the operation of the control circuit of FIG. 10A.
Figure 10C:
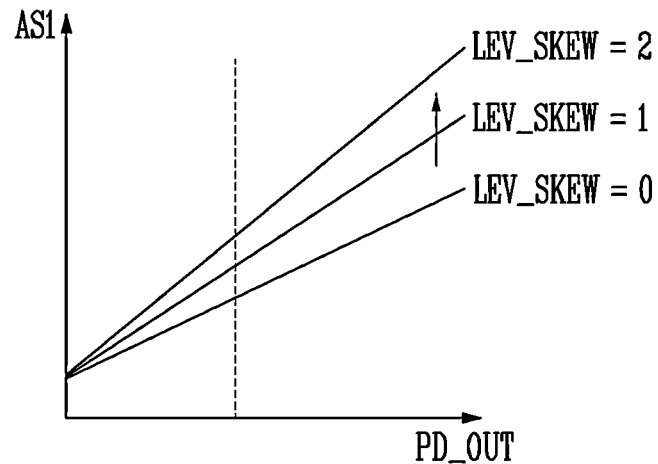

FIG. 9 is a diagram illustrating one embodiment of the control circuit included in the clock data recovery unit of FIG. 8. FIGS. 10A and 10B are diagrams illustrating other embodiments of the control circuit included in the clock data recovery unit of FIG. 8. FIGS. 10A and 10B illustrate other embodiments of control circuits in which a gain of a proportional path is adjusted based on a skew level LEV_SKEW (that is, a gain of a path or a proportional path, in which a proportional control function is performed or implemented in a proportional integral control technique, is adjusted). FIG. 10C is a diagram for describing the operation of the control circuit of FIG. 10A.

Referring first to FIGS. 8 and 9, a first clock data recovery unit CDR1 may be implemented as a digital clock data recovery unit.

A control circuit CC includes a decimator DECIM (decimation circuit or loop filter), first and second integrators INTEG1 and INTEG2 (or first and second integration circuits), and first to third digital-to-analog converters DAC1 to DAC3. According to embodiments, the control circuit CC may further include a fourth digital-to-analog converter DAC4. The decimator DECIM and the first and second integrators INTEG1 and INTEG2 may be implemented as digital circuits, and the first to third digital-to-analog converters DAC1 to DAC3 may be implemented as analog circuits.

The first digital-to-analog converter DAC1 may constitute a proportional path. The proportional path may be a circuit for proportionally reducing a difference between a current frequency of a first clock signal CLK1 and a target frequency (that is, a frequency required to recover first data Data1). As a gain of the proportional path (that is, a proportional gain) is increased, the first clock signal CLK1 may be changed more quickly to the target frequency.

The first digital-to-analog converter DAC1 may output a first analog signal AS1 proportional to an output PD_OUT of a phase detector PD.

The decimator DECIM, the first and second integrators INTEG1 and INTEG2 (or the first and second integration circuits), and the second and third digital-to-analog converters DAC2 and DAC3 may constitute an integral path. The integration path may be a circuit for reducing an error in a steady state of the first clock signal CLK1 (that is, a state in which the first clock signal CLK1 substantially has a target frequency and a target phase).

The first integrator INTEG1 and the second digital-to-analog converter DAC2 may constitute a frequency loop (or a frequency-locked loop), and the second integrator INTEG2 and the third digital-to-analog converter DAC3 may constitute a phase loop (or a phase-locked loop).

The decimator DECIM may perform digital processing on the output PD_OUT of the phase detector PD. The decimator DECIM may down-sample the output PD_OUT of the phase detector PD (or adjust or reduce a sampling rate) and may mitigate or remove distortion generated in a loop (for example, harmonic frequencies generated in a phase detecting process and/or a down-sampling process). That is, the decimator DECIM may function as a low-pass filter.

The first integrator INTEG1 may integrate an output DECIM_OUT of the decimator DECIM. For example, the first integrator INTEG1 may be implemented as a counter and may count pulses included in the output DECIM_OUT of the decimator DECIM. The second digital-to-analog converter DAC2 may convert an output INTEG1_OUT of the first integrator INTEG1 into a second analog signal AS2.

The second integrator INTEG2 may integrate the output DECIM_OUT of the decimator DECIM. For example, the second integrator INTEG2 may count and accumulate pulses included in the output DECIM_OUT of the decimator DECIM. The third digital-to-analog converter DAC3 may convert an output INTEG2_OUT of the second integrator INTEG2 into a third analog signal AS3.

The fourth digital-to-analog converter DAC4 may output a locked fourth analog signal AS4. The fourth digital-to-analog converter DAC4 outputting the fourth analog signal AS4 may be separately provided such that an oscillator OSC outputs a locked frequency. According to embodiments, the fourth digital-to-analog converter DAC4 may be omitted.

The first to fourth analog signals AS1 to AS4 may be included in a control signal CC_OUT. For example, the control signal CC_OUT may be generated by adding up the first to fourth analog signals AS1 to AS4.

In embodiments, the control circuit CC may adjust the gain of the proportional path (that is, the proportional gain) based on the skew level LEV_SKEW. For example, based on the skew level LEV_SKEW, the control circuit CC may adjust a step of the first digital-to-analog converter DAC1, a gain of the first digital-to-analog converter DAC1, or a signal provided to the first digital-to-analog converter DAC1 (for example, the output PD_OUT of the phase detector PD which is referred to as "driving current of a proportional path").

Referring to FIG. 10A, in a control circuit CC_1, the skew level LEV_SKEW (or information about the skew level LEV_SKEW) may be provided to a first digital-to-analog converter DAC1. The skew level LEV_SKEW may be provided to the first digital-to-analog converter DAC1 as a step control signal CS_STEP or a gain control signal CS_GAIN.

In one embodiment, a step of the first digital-to-analog converter DAC1 may be adjusted based on the skew level LEV_SKEW (for example, the step control signal CS_STEP). For example, the first digital-to-analog converter DAC1 may increase a level (or step) of a first analog signal AS1 by at least one step and output the first analog signal AS1. With respect to the same output PD_OUT of a phase detector PD, as the skew level LEV_SKEW is increased, the level of the first analog signal AS1 may be increased. Referring to FIG. 10C, for example, when the skew level LEV_SKEW is 0, the first digital-to-analog converter DAC1 may output the first analog signal AS1 having a first level (for example, a preset first voltage level or current level) with respect to an output having a value of 1 (or a digital value) (that is, the output PD_OUT of the phase detector PD), output the first analog signal AS1 having a second level with respect to an input of 2, and output the first analog signal AS1 having a third level with respect to an input of 3. For example, when the skew level LEV_SKEW is 1, the first digital-to-analog converter DAC1 may output the first analog signal AS1 having a second level with respect to an output of 1, output the first analog signal AS1 having a third level with respect to an input of 2, and output the first analog signal AS1 having a fourth level with respect to an input of 3. That is, in response to the skew level LEV_SKEW of 1, the first digital-to-analog converter DAC1 may increase the overall first analog signal AS1 by 1 (or one step) and output the first analog signal AS1. For example, when the skew level LEV_SKEW is 2, the first digital-to-analog converter DAC1 may output the first analog signal AS1 having a third level with respect to an output of 1 (that is, the output PD_OUT of the phase detector PD), output the first analog signal AS1 having a fourth level with respect to an input of 2, and output the first analog signal AS1 having a fifth level with respect to an input of 3. That is, in response to the skew level LEV_SKEW of 2, the first digital-to-analog converter DAC1 may increase the overall first analog signal AS1 by 2 (or two steps) and output the first analog signal AS1.

In another embodiment, a gain of the first digital-to-analog converter DAC1 may be adjusted based on the skew level LEV_SKEW (for example, the gain control signal CS_GAIN). For example, the first digital-to-analog converter DAC1 may vary a level of the first analog signal AS1 in proportion to the gain. As the skew level LEV_SKEW is increased, the level of the first analog signal AS1 may be increased in proportion to the skew level LEV_SKEW. That is, as the skew level LEV_SKEW is increased, the level of the first analog signal AS1 may be more rapidly increased for the same amount of increase in the output of the phase detector PD. Referring to FIG. 10C, for example, when the skew level LEV_SKEW is 0, a gain of the first digital-to-analog converter DAC1 may be 1, and the first digital-to-analog converter DAC1 may output the first analog signal AS1 having a specific level (for example, a voltage level or current level) with respect to an output of 4 (that is, the output PD_OUT of the phase detector PD). For example, when the skew level LEV_SKEW is 1, the gain of the first digital-to-analog converter DAC1 may be 1.1, and the first digital-to-analog converter DAC1 may output the first analog signal AS1 having a "1.1×specific level" with respect to an output of 4. For example, when the skew level LEV_SKEW is 2, the gain of the first digital-to-analog converter DAC1 may be 1.2, and the first digital-to-analog converter DAC1 may output the first analog signal AS1 having a "1.2×specific level" with respect to an output of 4.

When a level of the first analog signal AS1 is increased according to the skew level LEV_SKEW, a level of a control signal CC_OUT provided to an oscillator OSC may be increased, and the oscillator OSC may output a first clock signal CLK1 having a higher frequency in response to the control signal CC_OUT. That is, the first clock signal CLK1 may be changed more quickly to a target frequency. In addition, when the level of the first analog signal AS1 is increased according to the skew level LEV_SKEW, a magnitude of the control signal CC_OUT provided to the oscillator OSC may be increased, and the oscillator OSC may output the first clock signal CLK1 having a faster phase in response to the control signal CC_OUT. That is, the phase of the first clock signal CLK1 may be shifted until the skew level LEV_SKEW is removed.

Referring to FIG. 10B, a control circuit CC_2 may further include a driving circuit DRV connected between a decimator DECIM and a first digital-to-analog converter DAC1, and the skew level LEV_SKEW (or information about the skew level LEV_SKEW) may be provided to the driving circuit DRV. The skew level LEV_SKEW may be provided to the driving circuit DRV as a driving current control signal CS_I.

The driving circuit DRV may be implemented as a buffer and may transmit the output PD_OUT of the phase detector PD to the first digital-to-analog converter DAC1. In addition, the driving circuit DRV may vary an output PD_OUT of a phase detector PD based on the skew level LEV_SKEW (for example, the driving current control signal CS_I). For example, a driving current of a proportional path may be increased according to the skew level LEV_SKEW (for example, the driving current control signal CS_I), and the output PD_OUT of the phase detector PD (that is, the output PD_OUT of the phase detector PD provided to the first digital-to-analog converter DAC1) may be increased in response to the increased driving current. Accordingly, a level of a first analog signal AS1 output from the first digital-to-analog converter DAC1 may be varied or increased. For example, when the skew level LEV_SKEW is 0, the output PD_OUT of the phase detector PD having a value of 1 may be provided to the first digital-to-analog converter DAC1 by the driving circuit DRV without any change. For example, when the skew level LEV_SKEW is 1, the output PD_OUT of the phase detector PD having a value of 1 may be amplified to 1.1 by the driving circuit DRV, and a signal of 1.1 (that is, the output PD_OUT of the phase detector PD varied to 1.1) may be provided to the first digital-to-analog converter DAC1. For example, when the skew level LEV_SKEW is 2, the output PD_OUT of the phase detector PD having a value of 1 may be amplified to 1.2 by the driving circuit DRV, and a signal of 1.2 may be provided to the first digital-to-analog converter DAC1. Similar to the case in which the gain of the first digital-to-analog converter DAC1 is adjusted, a level of the first analog signal AS1 may be varied.

As described above, the control circuit CC may vary a gain of the proportional path based on the skew level LEV_SKEW. As the skew level LEV_SKEW is increased, the gain of the proportional path may be increased. Accordingly, the level of the first analog signal AS1 output from the first digital-to-analog converter DAC1 may be increased, and a first clock signal CLK1 output from the oscillator OSC may be changed more quickly to a target frequency in response to the control signal CC_OUT including the first analog signal AS1.

Figure 11:
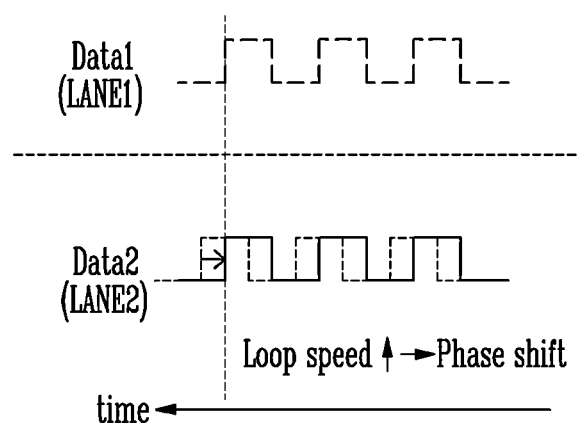
FIG. 11 is a diagram for describing the operation of the clock data recovery unit of FIG. 8.

FIG. 11 is a diagram for describing the operation of the clock data recovery unit of FIG. 8. FIG. 11 illustrates a phase change of data according to the operations (that is, skew compensation operations) of the first clock data recovery unit CDR1 described with reference to FIG. 8 and the control circuit CC described with reference to FIGS. 9 to 10B.

Referring to FIGS. 7 to 11, when the second lane LANE2 is a slow lane, a skew level LEV_SKEW may be provided to a second clock data recovery unit CDR2 connected to the second lane LANE2. In the same manner as in the operation of the first clock data recovery unit CDR1 described with reference to FIGS. 8 to 10B, based on the skew level LEV_SKEW, a loop speed of the second clock data recovery unit CDR2 may be increased, or a gain of a proportional path of the second clock data recovery unit CDR2 may be increased. Accordingly, a clock signal (or a second clock signal) may be more quickly recovered in the second clock data recovery unit CDR2 by following a phase (that is, a relatively fast phase) of first data Data1, and second data Data2 may be relatively quickly recovered in the second clock data recovery unit CDR2. Accordingly, a phase of the second data Data2 may be shifted. When the phase of the second data Data2 is the same as the phase of the first data Data1, a skew between a first lane LANE1 and the second lane LANE2 may be corrected.

Figure 12:
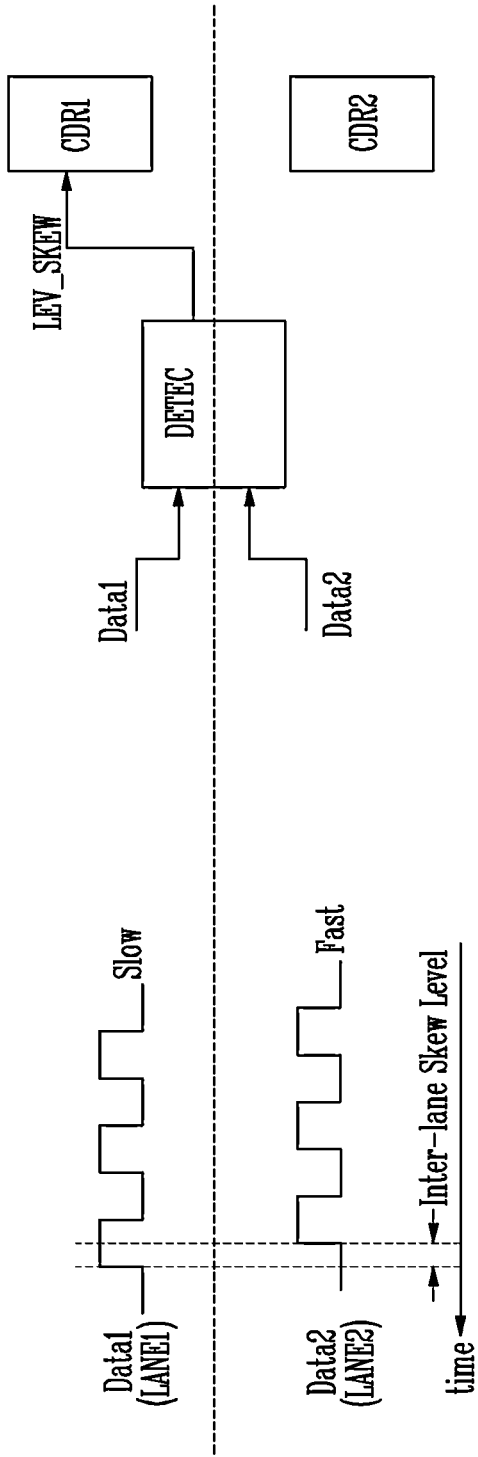
FIG. 12 is a diagram for describing the operation of a detector included in the data transceiver of FIG. 6.

FIG. 12 is a diagram for describing the operation of the detector included in the data transceiver of FIG. 6. FIG. 12 is a diagram corresponding to FIG. 7.

Referring to FIGS. 1 and 6 to 12, the receiver RXD may sequentially perform an operation of detecting a skew by comparing a first data Data1 and a second data Data2, an operation of determining a slow lane in which data transmission is relatively delayed (and a fast lane in which data transmission is relatively fast), and an operation of adjusting a loop speed (or a bandwidth) of a clock data recovery unit connected to the slow lane.

Unlike the embodiment of FIG. 7, as shown in FIG. 12, a first phase of the first data Data1 transmitted through the first lane LANE1 may lag a second phase of the second data Data2. In this case, the detector DETEC may determine the second lane LANE2 as a fast lane and determine the first lane LANE1 as a slow lane. In addition, the detector DETEC may provide information about a skew level LEV_SKEW to the first clock data recovery unit CDR1 connected to the first lane LANE1 that is the slow lane. In this case, as described with reference to FIGS. 8 to 10B, based on the skew level LEV_SKEW, a loop speed of the first clock data recovery unit CDR1 may be increased, or a gain of a proportional path of the first clock data recovery unit CDR1 may be increased. Accordingly, a first clock signal CLK1 may be more quickly recovered in the first clock data recovery unit CDR1 by following a phase of second data Data2, and first data Data1 may be relatively quickly recovered in the first clock data recovery unit CDR1. Accordingly, a phase of the first data Data1 may be shifted. As a phase shift of the first data Data1 and a phase shift of the second data Data2 described with reference to FIG. 11 are repeatedly performed, a skew between the first lane LANE1 and the second lane LANE2 may be corrected.

Figure 13:
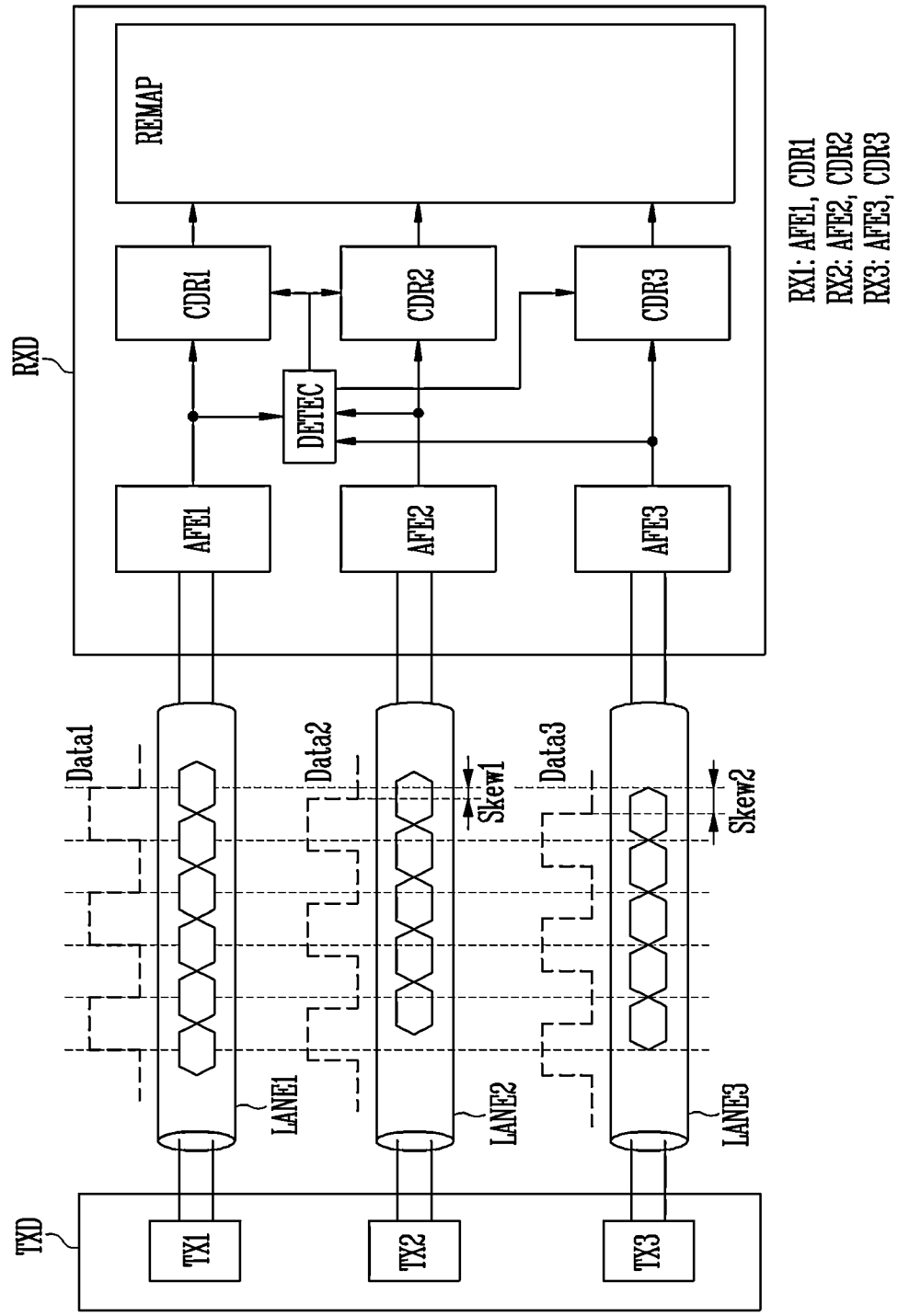
FIG. 13 is a diagram illustrating another embodiment of the data transceiver of FIG. 1.

FIG. 13 is a diagram illustrating another embodiment of the data transceiver of FIG. 1. FIG. 13 is a diagram corresponding to FIG. 6. Differences from FIG. 6 will be mainly described, and redundant descriptions will not be repeated.

Referring to FIGS. 1, 6, and 13, a transmitter TXD may transmit data through a first to third lanes LANE1, LANE2, and LANE3. For example, the transmitter TXD may transmit first data Data1 through a first data transmission unit TX1 and simultaneously may transmit second data Data2 through a second data transmission unit TX2.

A skew may occur due to an asymmetric design of the first to third lanes LANE1, LANE2, and LANE3. For example, a first skew 1 may occur between the first lane LANE1 and the second lane LANE2, and a second skew Skew2 may occur between the second lane LANE2 and the third lane LANE3.

A receiver RXD may compare the first data Data1, the second data Data2, and the third data Data3 to detect skews (that is, the first skew 1 and the second skew 2 between the first lane LANE1, the second lane LANE2, and the third lane LANE3, may determine a fast lane and slow lanes based on the skews, and may adjust a loop speed of each of clock data recovery units connected to the slow lanes.

A third data reception unit RX3 may include a third analog front end AFE3 and a third clock data recovery unit CDR3. Since the third data reception unit RX2 (for example, the third analog front end AFE3 and the third clock data recovery unit CDR3) is substantially the same or similar to a first data reception unit RX1 (for example, a first analog front end AFE1 and a first clock data recovery unit CDR1), a description of the third data reception unit RX3 will be omitted.

A detector DETEC may compare the first lane LANE1, the second lane LANE2, and the third lane LANE3 to detect skews (that is, the first Skew 1 and the second Skew 2, may determine a fast lane and slow lanes based on the skews, and may provide a skew level (or information about a skew level) of skews corresponding to the clock data recovery units connected to the slow lanes.

For example, the detector DETEC may determine the first lane LANE1 as a fast lane and determine the second lane LANE2 and the third lane LANE3 as slow lanes. In addition, the detector DETEC may provide information about the first skew Skew1 (that is, a skew level) to a second clock data recovery unit CDR2 connected to the second lane LANE2 and provide information about the second skew Skew2 (that is, a skew level) to the third clock data recovery unit CDR3 connected to the third lane LANE3.

A loop speed of the second clock data recovery unit CDR2 may be adjusted based on the first skew Skew1, and a loop speed of the third clock data recovery unit CDR3 may be adjusted based on the second skew Skew1. Each of the second clock data recovery unit CDR2 and the third clock data recovery unit CDR3 may be operated in the same manner as the first clock data recovery unit CDR1 described with reference to FIGS. 8 to 10B. Accordingly, a phase of the second data Data2 may be shifted and may be the same as a phase of the first data Data1. Similarly, a phase of the third data Data3 may be shifted and may be the same as the phase of the first data Data1. That is, skews between the first lane LANE1, the second lane LANE2, and the third lane LANE3 may be corrected.

A remapper REMAP may re-arrange (reconstitute or remap) the first data Data1, the second data Data2, and the third data Data3 to recover a source data.

Although three lanes, that is, the first to third lanes LANE1, LANE2, and LANE3 have been described by being illustrated in FIG. 13, the present invention is not limited thereto. For example, data may be transmitted through four lanes (that is, the first to fourth lanes LANE1 to LANE4) illustrated in FIG. 1, and skews between the first lane LANE1, the second lane LANE2, the third lane LANE3, and the fourth lane LANE4 may also be corrected in the same manner as in the embodiment of FIG. 12.

Figure 14:
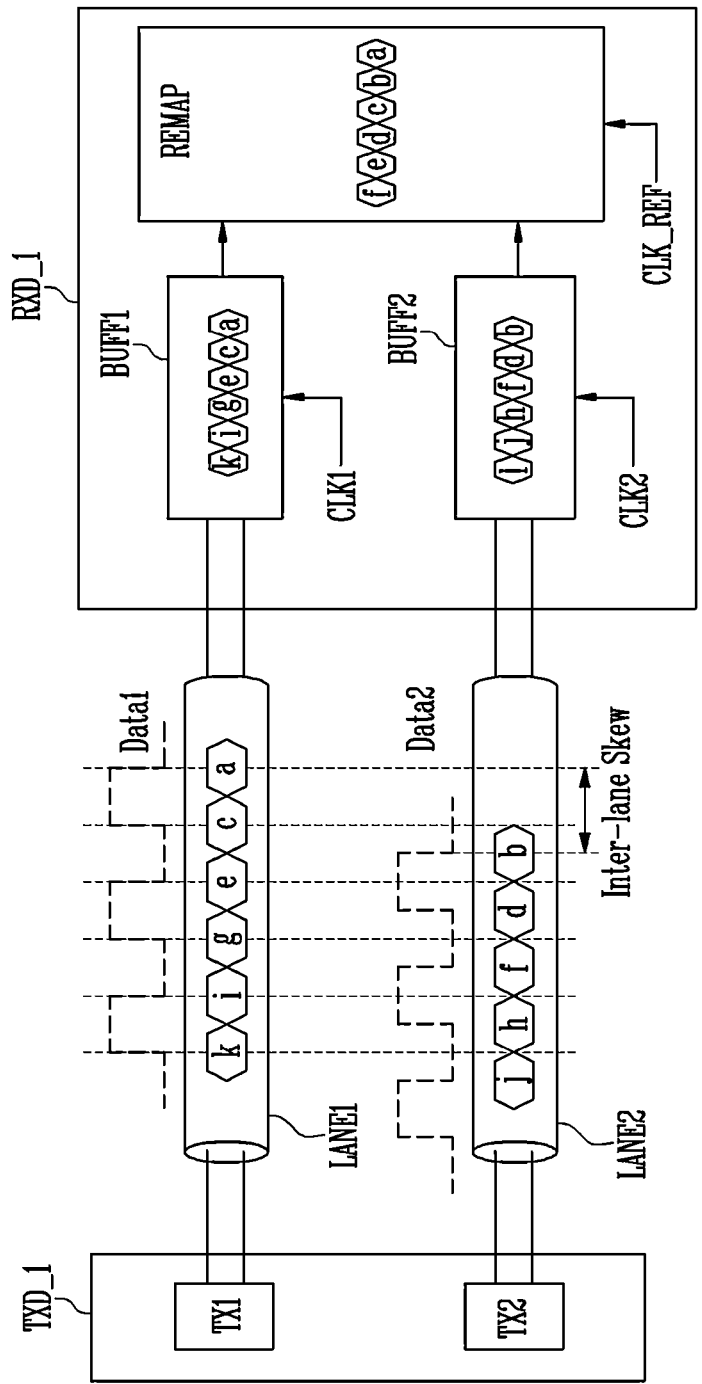
FIG. 14 is a diagram illustrating still another embodiment of the data transceiver of FIG. 1.

FIG. 14 is a diagram illustrating still another embodiment of the data transceiver of FIG. 1.

Referring to FIGS. 1, 6, and 14, a receiver RXD_1 of FIG. 14 may further include first and second buffers BUFF1 and BUFF2 in comparison with the receiver RXD of FIG. 6. Although the first and second analog front ends AFE1 and AFE2 and the first and second clock data recovery units CDR1 and CDR2 included in the receiver RXD of FIG. 6 are omitted for convenience of description, the receiver RXD_1 of FIG. 14 may include internal components of the receiver RXD of FIG. 6. Except for the first and second buffers BUFF1 and BUFF2, the receiver RXD_1 of FIG. 14 is substantially the same or similar to the receiver RXD of FIG. 6, and thus, redundant descriptions will not be repeated.

A transmitter TXD may transmit data through first and second lanes LANE1 and LANE2.

A skew may occur between the first lane LANE1 and the second lane LANE2. In particular, when the skew between the first lane LANE1 and the second lane LANE2 is one bit or less, the skew may be corrected through the receiver RXD of FIG. 6. On the other hand, when the skew between the first lane LANE1 and the second lane LANE2 exceeds one bit, the skew may be corrected through the receiver RXD_1 of FIG. 14.

The first buffer BUFF1 may be connected to the first lane LANE1 and may sequentially store bits of first data Data1 (or first payload data) in response to a first clock signal CLK1. For example, the first buffer BUFF1 may be implemented as a memory device or a memory buffer. According to embodiments, a capacity of the first buffer BUFF1 may be designed differently, for example, the capacity of the first buffer BUFF1 may be at least 160 bits.

The first clock signal CLK1 may be a clock signal recovered by a first clock data recovery unit CDR1 (see FIG. 6). For example, the first buffer BUFF1 may be connected between the first clock data recovery unit CDR1 and a remapper REMAP, may store the first data Data1 in response to the first clock signal CLK1 generated by the first clock data recovery unit CDR1, and may provide the stored first data Data1 to the remapper REMAP.

The second buffer BUFF2 may be connected to the second \lane LANE2 and may sequentially store bits of second data Data2 (or second payload data) in response to a second clock signal CLK2. The second buffer BUFF2 may be substantially the same or similar to the first buffer BUFF1.

The second clock signal CLK2 may be a clock signal recovered by a second clock data recovery unit CDR2 (see FIG. 6). Due to the skew between the first lane LANE1 and the second lane LANE2, the second clock signal CLK2 (or a phase of the second clock signal CLK2) may be different from the first clock signal CLK1 (or a phase of the first clock signal CLK1). According to skew correction, the phase of the second clock signal CLK2 may be the same as the phase of the first clock signal CLK1.

For example, the second buffer BUFF2 may be connected between the second clock data recovery unit CDR2 and the remapper REMAP, may store the second data Data2 in response to the second clock signal CLK2 generated by the second clock data recovery unit CDR2, and may provide the stored second data Data1 to the remapper REMAP.

The remapper REMAP may re-arrange (reconstitute or remap) the first data Data1 and the second data Data2 in response to a reference clock signal CLK_REF (or a reference clock) to recover source data. Here, the reference clock signal CLK_REF may be the first clock signal CLK1 or the second clock signal CLK2 or a skew-corrected clock signal (for example, the skew-corrected first clock signal CLK1 or second clock signal CLK2).

That is, the first and second buffers BUFF1 and BUFF2 separately and temporarily store the first and second data Data1 and Data2 using the first and second clock signals CLK1 and CLK2, respectively, and the remapper REMAP may receive the first and second data Data1 and Data2 using the reference clock signal CLK_REF (that is, receive the first and second data Data1 and Data2 in the order in which the first and second data Data1 and Data2 are stored in the first and second buffers BUFF1 and BUFF2) and may rearrange the first and second data Data1 and Data2.

Although only the first and second buffers BUFF1 and BUFF2 with respect to the first and second lanes LANE1 and LANE2 are illustrated in FIG. 14, the present invention is not limited thereto. For example, four buffers corresponding to the first to fourth lanes LANE1 to LANE4, respectively, illustrated in FIG. 1 may be provided in the receiver RXD_1.

Figure 15:
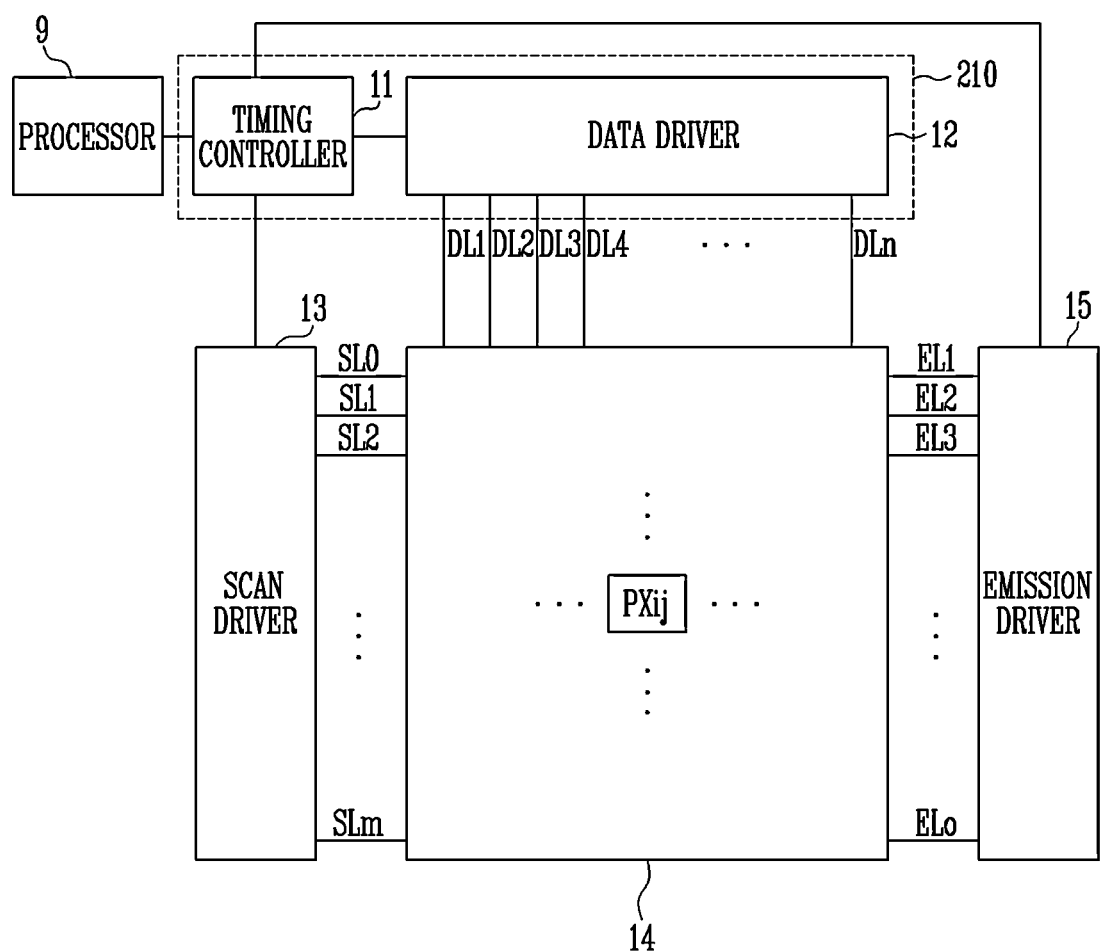
FIG. 15 is a diagram illustrating a display device according to embodiments.

FIG. 15 is a diagram illustrating a display device according to embodiments.

Referring to FIG. 15, the display device may include a timing controller 11, a data driver 12, a scan driver 13, a pixel unit 14, and an emission driver 15. However, whether each functional unit is integrated into one IC, integrated into a plurality of ICs, or mounted on a display substrate may be variously determined according to a specification of the display device. The timing controller 11 and the data driver 12 may be integrated into one IC to constitute one display driver 210. In this case, the display driver 210 may be referred to as the above-described TED IC. The display driver 210 may further include at least one of the scan driver 13 and the emission driver 15 according to a type thereof.

A processor 9 may correspond to at least one of a GPU, a CPU, and an AP. The processor 9 may correspond to the above-described transmitter TXD. The timing controller 11, the data driver 12, or the display driver 210 may correspond to the above-described receiver RXD (see FIG. 1).

The timing controller 11 may receive gradations and timing signals for each display frame period from the processor 9. The timing signals may include a vertical synchronization signal, a horizontal synchronization signal, a data enable signal, and the like.

Each cycle of the vertical synchronization signal may correspond to each display frame period. Each cycle of the horizontal synchronization signal may correspond to each horizontal period. The gradations may be supplied in a horizontal line unit in each horizontal period in response to a pulse of the data enable signal. A horizontal line may refer to pixels (for example, a pixel row) connected to the same scan line and emission line.

The timing controller 11 may render the gradations so as to correspond to the specification of the display device. For example, the processor 9 may provide a red gradation, a green gradation, and a blue gradation with respect to each unit dot. For example, when the pixel unit 14 has a red-green-blue ("RGB") stripe structure, the pixels may be in one-to-one correspondence to the gradations. In this case, the rendering of the gradations may not be required. However, for example, when the pixel unit 14 has a PENTILE™ structure, since adjacent unit dots share pixels, the pixels may not be in one-to-one correspondence to the gradations. In this case, the rendering of the gradations may be required. Gradations that are rendered or not rendered may be provided to the data driver 12. In addition, the timing controller 11 may provide a data control signal to the data driver 12. Furthermore, the timing controller 11 may provide a scan control signal to the scan driver 13 and provide an emission control signal to the emission driver 15.

The data driver 12 may use the gradations and the data control signal received from the timing controller 11 to generate data voltages (that is, data signals) to be provided to data lines DL1, DL2, DL3, DL4, . . . , and DLn. n may be an integer greater than 0.

The scan driver 13 may use the scan control signal (for example, a clock signal, a scan start signal, or the like) received from the timing controller 11 to generate scan signals to be provided to scan lines SL0, SL1, SL2, . . . , and SLm. The scan driver 13 may sequentially supply scan signals having a turn-on level pulse to the scan lines SL0 to SLm. The scan driver 13 may include scan stages formed in the form of a shift register. The scan driver 13 may generate scan signals through a method of sequentially transferring scan start signals in the form of a turn-on level pulse to next scan stages according to control of a clock signal. m may be an integer greater than 0.

The emission driver 15 may use the emission control signal (for example, a clock signal, an emission stop signal, or the like) received from the timing controller 11 to generate emission signals to be provided to emission lines EL1, EL2, EL3, . . . , and ELo). The emission driver 15 may sequentially supply emission signals having a turn-off level pulse to the emission lines EL1 to ELo. The emission driver 15 may include emission stages formed in the form of a shift register. The emission driver 15 may generate emission signals through a method of sequentially transferring emission stop signals in the form of a turn-off level pulse to next emission stages according to control of a clock signal. o may be an integer greater than 0. In embodiments, the emission driver 15 may be omitted.

The pixel unit 14 includes pixels. Each pixel PXij may be connected to a corresponding data line, scan line, and emission line. The pixels may include pixels emitting light having a first color, pixels emitting light having a second color, and pixels emitting light having a third color. The first color, the second color, and the third color may be different colors. For example, the first color may be one color of a red color, a green color, and a blue color, the second color may be one color of the red color, the green color, and the blue color excluding the first color, and the third color may be the remaining color of the red color, the green color, and the blue color excluding the first color and the second color. In addition, magenta, cyan, and yellow may be used as the first to third colors instead of the red color, the green color, and the blue color.

The pixel Pxij may include at least one transistor and a light-emitting element. The light-emitting element may be a light-emitting diode. The light-emitting element may be provided as an organic light-emitting diode, an inorganic light-emitting diode, or a quantum dot/well light-emitting diode. The light-emitting element may emit light in any one color of the first color, the second color, and the third color. A plurality of light-emitting elements may be provided in each pixel. In this case, the plurality of light-emitting elements may be connected in series, parallel, series-parallel, or the like.

Figure 16:
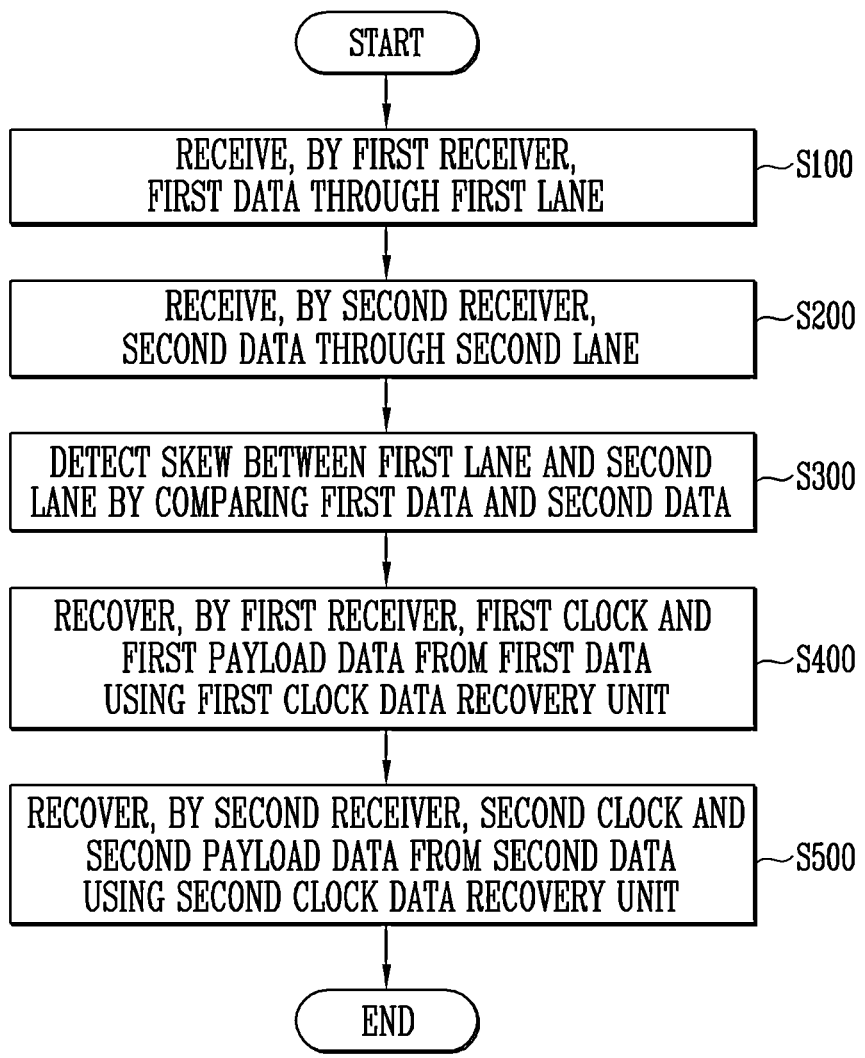
FIG. 16 is a flowchart illustrating a method of receiving data according to embodiments of the present invention.

FIG. 16 is a flowchart illustrating a method of receiving data according to embodiments of the present invention.

Referring to FIGS. 1, 6, 8, 15, and 16, the method of receiving data may be performed by a receiver RXD (or a timing controller 11 of FIG. 15) communicating with a data transmitter TXD (host or processor 9 of FIG. 15) through a plurality of lanes LANE1 to LANE4.

In the method of FIG. 16, a first data reception unit RX1 may receive first data Data1 through a first lane LANE1 (S100). In addition, the method of FIG. 16, a second data reception unit RX2 may receive second data Data1 through a second lane LANE2 (S200).

In the method of FIG. 16, a skew between the first lane LANE1 and the second lane LANE2 may be detected by comparing the first data Data1 and the second data Data2 (S300).

As described with reference to FIGS. 6 and 7, in the method of FIG. 16, a fast lane and a slow lane may be determined by comparing the first data Data1 and the second data Data2 through a detector DETEC, and information about a skew level may be provided to a reception unit connected to the slow lane.

In the method of FIG. 16, a first data reception unit RX1 may recover a first clock signal and first payload data from the first data Data1 (or a first data signal) using a first clock data recovery unit CDR1 (S400). In addition, at the same time, in the method of FIG. 16, a second data reception unit RX2 may recover a second clock signal and second payload data from the second data Data2 (or a second data signal) using a second clock data recovery unit CDR2 (S500).

Since a configuration for restoring the clock signal and the payload data has been described with reference to FIGS. 8 and 9, a description thereof will be omitted.

In embodiments, in the method of FIG. 16, a loop speed of a clock data recovery unit connected to the slow lane may be controlled based on a skew level of the skew.

Referring to FIG. 7, for example, when the first lane LANE1 is determined as the slow lane, in the method of FIG. 16, a loop speed of the second clock data recovery unit CDR2 may be controlled based on a skew level LEV_SKEW.

As described with reference to FIGS. 7 and 11, when the first lane LANE1 is determined as the slow lane, in the method of FIG. 16, by controlling the loop speed of the second clock data recovery unit CDR2, a phase of the second data Data2 (or the second payload data) may be shifted and may be the same as a phase of the first data Data1 (or the first payload data).

In embodiments, in the method of FIG. 16, when the clock data recovery unit uses a PI control technique or is implemented as a PI-clock data recovery unit, a proportional gain may be adjusted.

As described with reference to FIG. 9, a proportional path is formed by a phase detector PD and a first digital-to-analog converter DAC1, and in the method of FIG. 16, it is possible to adjust a gain of the proportional path, that is, a proportional gain.

As described with reference to FIGS. 10A and 10B, in the method of FIG. 16, based on the skew level LEV_SKEW, it is possible to adjust at least one of a step of the first digital-to-analog converter DAC1, a gain of the first digital-to-analog converter DAC1, and a driving current of the proportional path (that is, an output PD_OUT of the phase detector PD provided to the first digital-to-analog converter DAC1.

As described above, in the method of receiving data, the loop speed of the clock data recovery unit connected to the slow lane may be adjusted based on the skew level LEV_SKEW. In the method of receiving data, a gain of a proportional path in the clock data recovery unit may be varied based on the skew level LEV_SKEW. Accordingly, a phase of data transmitted through the slow lane may be shifted. As a skew correction operation is repeatedly performed on the slow lane, a phase of data corresponding to the slow lane may be the same as a phase of data corresponding to the fast lane. That is, a skew between lanes may be corrected.

In a data receiver, a display device including the same, and a method of receiving data according to embodiments of the present invention, it is possible to detect a skew detected by comparing first data and second data transmitted through lanes, and it is possible to determine a fast lane in which data transmission is relatively fast and a slow lane in which data transmission is relatively delayed, thereby controlling (or adjusting a loop speed (or a bandwidth) of a clock data recovery unit connected to the slow lane based on a level of the skew. Accordingly, a phase of data (for example, first data) corresponding to the clock data recovery unit may be shifted and may be the same as a phase of the second data. That is, the skew can be corrected or compensated.

The referenced drawings and the detailed description of the invention are provided merely for the purpose of explaining embodiments of the invention and are not intended to limit the technical scope of the invention defined by the following claims. Therefore, it will be appreciated by those skill in the art that various modifications and other equivalent embodiments can be made. The technical scope of the present invention should thus be defined by the technical ideas of the following claims.

What is claimed is:

1. A data receiver which communicates with a data transmitter through a plurality of lanes, the data receiver comprising:
a first reception unit which receives first data through a first lane;
a second reception unit which receives second data through a second lane; and
a detector which compares the first data and the second data to detect a skew between the first lane and the second lane,
wherein the first reception unit includes a first clock data recovery unit which recovers a first clock and first payload data from the first data,
wherein the first reception unit controls a loop speed of the first clock data recovery unit based on a skew level of the skew,
wherein the loop speed is defined as a change rate of at least one of a frequency and a phase of the first clock in a process of recovering the first clock, and
wherein the first clock data recovery unit includes:
an oscillator which outputs a clock having a frequency according to a control signal thereto, wherein the clock corresponds to the first clock;
a phase detector which compares the first data and the clock; and
a control circuit which adjusts the control signal based on an output of the phase detector.

2. The data receiver of claim 1, wherein the detector compares the first data and the second data to determine a slow lane of the first lane and the second lane and in which data transmission is relatively delayed, and the detector provides information about the skew level to a reception unit of the first reception unit and the second reception unit and connected to the slow lane.

3. The data receiver of claim 2, wherein, when the first lane is determined as the slow lane, a phase of the first payload data is shifted by controlling the loop speed of the first clock data recovery unit connected to the first lane.

4. The data receiver of claim 1, wherein the first clock data recovery unit recovers the first clock and the first payload data using a proportional integral (PI) control technique and adjusts a proportional gain of the PI control technique based on the skew level.

5. The data receiver of claim 4, wherein
the control circuit adjusts the control signal using the PI control technique.

6. The data receiver of claim 5, wherein the control circuit includes:
a first digital-to-analog converter which outputs a first analog signal proportional to the output of the phase detector;
an integrator which integrates the output of the phase detector; and
a second digital-to-analog converter which converts an output of the integrator into a second analog signal,
wherein the first analog signal and the second analog signal are included in the control signal.

7. The data receiver of claim 6, wherein the control circuit adjusts a step of the first digital-to-analog converter based on the skew level, and
wherein with respect to a same output of the phase detector, as the skew level is increased, a level of the first analog signal is also increased.

8. The data receiver of claim 6, wherein the control circuit adjusts a gain of the first digital-to-analog converter based on the skew level, and
wherein as the skew level is increased, the level of the first analog signal is more rapidly increased for a same amount of increase in the output of the phase detector.

9. The data receiver of claim 6, wherein the control circuit adjusts the output of the phase detector provided to the first digital-to-analog converter based on the skew level.

10. The data receiver of claim 1, further comprising a third reception unit which receives third data through a third lane,
wherein the detector detects a skew between the second lane and the third lane, and wherein the third reception unit includes a third clock data recovery unit which recovers a third clock and third payload data from the third data and controls a loop speed of the third clock data recovery unit based on a skew level of the skew between the second lane and the third lane.

11. The data receiver of claim 1, further comprising:
a first buffer which stores the first data in response to the first clock; and
a second buffer which stores the second data in response to a second clock,
wherein the second reception unit includes a second clock data recovery unit which recovers the second clock and second payload data from the second data.

12. The data receiver of claim 1, wherein the first reception unit and the second reception unit receive data according to a mobile industry processor interface (MIPI) protocol.

13. The data receiver of claim 1, wherein each of the first lane and the second lane includes a first sub-lane and a second sub-lane,
wherein each of the first and second reception units receives signals having a first voltage range in a first mode through the first and second sub-lanes and receives signals having a second voltage range less than the first voltage range in a second mode through the first and second sub-lanes, and
wherein the first reception unit is driven in order of the first mode, the second mode, and the first mode, when receiving the first data.

14. The data receiver of claim 13, wherein, in the first mode, the first and second sub-lanes are used in a single-ended manner, and
wherein, in the second mode, the first and second sub-lanes are used in a differential manner.

15. A display device comprising:
a timing controller which communicates with a host through a mobile industry processor interface (MIPI) and generate image data; and
a display panel which displays an image corresponding to the image data,
wherein the timing controller includes:
a first reception unit which receives first data through a first lane,
a second reception unit which receives second data through a second lane,
a remapper which rearranges the first data and the second data to generate the image data, and
a detector which compares the first data and the second data to detect a skew between the first lane and the second lane,
wherein the first reception unit includes a first clock data recovery unit which recovers a first clock and first payload data from the first data,
wherein the first reception unit controls a loop speed of the first clock data recovery unit based on a skew level of the skew, and
wherein the loop speed is defined as a change rate of at least one of a frequency and a phase of the first clock in a process of recovering the first clock, and
wherein the first clock data recovery unit includes:
an oscillator which outputs a clock having a frequency according to a control signal thereto, wherein the clock corresponds to the first clock;
a phase detector which compares the first data and the clock; and
a control circuit which adjusts the control signal based on an output of the phase detector.

16. A method of receiving data performed by a timing controller configured to communicate with a host through a plurality of lanes, the method comprising:
receiving, by a first reception unit, first data through a first lane;
receiving, by a second reception unit, second data through a second lane;
detecting a skew between the first lane and the second lane by comparing the first data and the second data;
recovering, by the first reception unit, a first clock and first payload data from the first data using a first clock data recovery unit by:
outputting a clock having a frequency according to a control signal using an oscillator;
comparing the first data and the clock using a phase detector; and
adjusting the control signal based on an output of the phase detector and the skew level; and
recovering, by the second reception unit, a second clock and second payload data from the second data using a second clock data recovery unit,
wherein the detecting of the skew includes controlling a loop speed of the first clock data recovery unit based on a skew level of the skew, and
wherein the loop speed is defined as a change rate of at least one of a frequency and a phase of the first clock or second clock in a process of recovering the first clock or the second clock.

17. The method of claim 16, wherein the detecting of the skew further includes:
by comparing the first data and the second data, determining a slow lane of the first lane and the second lane and in which data transmission is relatively delayed; and
providing information about the skew level to a reception unit of the first reception unit and the second reception unit and connected to the slow lane.

18. The method of claim 17, wherein, when the first lane is determined as the slow lane, by controlling the loop speed, a phase of the first payload data is shifted to be the same as a phase of the second payload data.

19. The method of claim 16, wherein the adjusting of the control signal includes:
outputting a first analog signal proportional to the output of the phase detector using a first digital-to-analog converter;
integrating the output of the phase detector using an integrator; and
converting an output of the integrator into a second analog signal using a second digital-to-analog converter,
wherein the first analog signal and the second analog signal are included in the control signal, and
wherein the outputting of the first analog signal includes adjusting at least one among a step of the first digital-to-analog converter, a gain of the first digital-to-analog converter, and the output of the phase detector provided to the first digital-to-analog converter based on the skew level.

* * * * *